US008844291B2

(12) United States Patent
Gilmore et al.

(10) Patent No.: US 8,844,291 B2
(45) Date of Patent: Sep. 30, 2014

(54) UNIVERSAL HEAT ENGINE

(75) Inventors: Eric M Gilmore, Lutz, FL (US);
Michael B Gilmore, Tampa, FL (US);
Richard Jan Kahler, Seminole, FL
(US); Timothy K. Mariani, legal
representative, Clearwater, FL (US);
Patrick Sheppard, Reddington Beach,
FL (US); James M Berry, Seminole, FL
(US)

(73) Assignee: VaporGenics Inc., Tampa, FL (US)

( * ) Notice: Subject to any disclaimer, the term of this patent is extended or adjusted under 35 U.S.C. 154(b) by 22 days.

(21) Appl. No.: 13/374,060

(22) Filed: Dec. 9, 2011

(65) Prior Publication Data

US 2012/0317980 A1 Dec. 20, 2012

Related U.S. Application Data

(60) Provisional application No. 61/459,331, filed on Dec. 10, 2010.

(51) Int. Cl.
F01K 23/12 (2006.01)
F15B 13/043 (2006.01)
F25B 1/00 (2006.01)
B60H 1/32 (2006.01)

(52) U.S. Cl.
CPC .......... B60H 1/3232 (2013.01); B60H 1/3226 (2013.01); Y02E 10/46 (2013.01)
USPC ............ 60/670; 137/625.64; 91/461; 62/116

(58) Field of Classification Search
USPC ............... 60/508, 520, 593, 670; 62/6, 323.1, 62/239–244; 137/625.2–625.64; 251/25; 417/137; 91/304, 461
See application file for complete search history.

(56) References Cited

U.S. PATENT DOCUMENTS

| 1,870,848 | A | * | 8/1932 | Hewitt | 137/625.66 |
|---|---|---|---|---|---|
| 3,129,645 | A | * | 4/1964 | Olmsted | 91/461 |
| 3,662,553 | A | * | 5/1972 | Hodgkinson | 60/670 |
| 3,823,573 | A | * | 7/1974 | Cassady | 62/238.4 |
| 3,988,901 | A | * | 11/1976 | Shelton et al. | 62/116 |

(Continued)

FOREIGN PATENT DOCUMENTS

| EP | 1750959 B1 | 9/2009 |
|---|---|---|
| EP | 2126483 A1 | 12/2009 |

(Continued)

Primary Examiner — Thomas Denion
Assistant Examiner — Laert Dounis
(74) Attorney, Agent, or Firm — Frijouf, Rust & Pyle P.A.

(57) ABSTRACT

A universal heat engine is disclosed for converting energy from an input heat source to an output. The universal heat engine comprises a heat engine section and an output section. The heat engine section includes a heat engine bore receiving a heat engine piston. A heat engine valve assembly communicates with the heat engine bore for effecting reciprocal motion of the heat engine piston. The output section includes an output bore receiving an output piston. A piston rod interconnects the heat engine piston to the output piston. A control controls the heat engine valve assemblies to operate the heat engine section in accordance with a desired output from the output section. The heat source may comprise the burning of a petroleum product, a solar heat source, geothermal heat source or a byproduct heat source. The output may comprise a static or mobile air conditioning system or an electrical generator.

28 Claims, 29 Drawing Sheets

(56) References Cited

U.S. PATENT DOCUMENTS

| | | | |
|---|---|---|---|
| 4,018,581 A * | 4/1977 | Ruff et al. | 237/2 B |
| 4,406,306 A * | 9/1983 | Kolze | 62/324.6 |
| 4,666,373 A | 5/1987 | Sugiura | |
| 4,823,560 A * | 4/1989 | Rowley et al. | 62/467 |
| 5,129,236 A | 7/1992 | Solomon | |
| 5,275,014 A * | 1/1994 | Solomon | 62/324.1 |
| 5,282,366 A * | 2/1994 | Reilly et al. | 62/292 |
| 5,365,908 A | 11/1994 | Takii et al. | |
| 5,509,274 A | 4/1996 | Lackstrom | |
| 5,674,053 A * | 10/1997 | Paul et al. | 417/228 |
| 5,725,365 A | 3/1998 | Solomon et al. | |
| 6,138,649 A | 10/2000 | Khair et al. | |
| 6,167,703 B1 | 1/2001 | Rumez et al. | |
| 6,467,269 B1 | 10/2002 | Dutart | |
| 6,532,916 B2 * | 3/2003 | Kerrebrock | 123/46 E |
| 6,541,875 B1 * | 4/2003 | Berlinger et al. | 290/1 R |
| 6,546,713 B1 | 4/2003 | Hidaka et al. | |
| 6,554,088 B2 | 4/2003 | Severinsky et al. | |
| 6,625,978 B1 | 9/2003 | Eriksson et al. | |
| 6,651,432 B1 | 11/2003 | Gray, Jr. | |
| 6,732,723 B2 | 5/2004 | van Nieuwstadt | |
| 6,739,139 B1 | 5/2004 | Solomon | |
| 6,896,789 B2 | 5/2005 | Ross | |
| 6,915,656 B2 * | 7/2005 | Ratliff | 62/324.6 |
| 7,003,964 B2 * | 2/2006 | Solomon | 62/6 |
| 7,207,188 B2 | 4/2007 | Solomon | |
| 7,571,699 B2 | 8/2009 | Forner, Sr. et al. | |
| 7,591,143 B2 | 9/2009 | Zeigler et al. | |
| 7,591,303 B2 | 9/2009 | Zeigler et al. | |
| 7,629,530 B2 | 12/2009 | Inaoka | |
| 7,726,129 B2 | 6/2010 | Driver | |
| 7,748,226 B2 | 7/2010 | Iwanami et al. | |
| 7,765,824 B2 | 8/2010 | Wong et al. | |
| 7,891,575 B2 | 2/2011 | Sami | |
| 7,975,501 B2 | 7/2011 | Borghi | |
| 8,453,722 B2 | 6/2013 | Zeigler et al. | |
| 8,522,569 B2 | 9/2013 | Avery et al. | |
| 8,544,270 B2 | 10/2013 | Kasuya | |
| 8,601,988 B2 | 12/2013 | Graef | |
| 8,607,855 B2 | 12/2013 | Feuerecker et al. | |
| 2004/0237562 A1 | 12/2004 | Solomon | |
| 2006/0117783 A1 | 6/2006 | Solomon | |
| 2008/0148731 A1* | 6/2008 | Cao | 60/641.2 |
| 2009/0000327 A1 | 1/2009 | Burk et al. | |
| 2009/0077961 A1 | 3/2009 | Baker | |
| 2009/0277152 A1 | 11/2009 | Sutherland | |
| 2009/0277400 A1 | 11/2009 | Conry | |
| 2009/0301702 A1 | 12/2009 | Zeigler et al. | |
| 2010/0101224 A1 | 4/2010 | Kasuya et al. | |
| 2010/0156111 A1 | 6/2010 | Pesce et al. | |
| 2010/0294217 A1 | 11/2010 | Kasuya et al. | |
| 2011/0174006 A1 | 7/2011 | Arendt et al. | |
| 2011/0219801 A1 | 9/2011 | McKenzie | |
| 2011/0265501 A1 | 11/2011 | Nir | |
| 2011/0271674 A1 | 11/2011 | Teng et al. | |
| 2011/0296849 A1 | 12/2011 | Benson | |
| 2012/0096884 A1 | 4/2012 | Schaefer et al. | |
| 2012/0117986 A1 | 5/2012 | Hammond | |
| 2012/0180511 A1 | 7/2012 | Pedersen | |
| 2012/0198840 A1 | 8/2012 | Stegmaier et al. | |
| 2012/0216763 A1 | 8/2012 | Barnes | |
| 2012/0247134 A1 | 10/2012 | Gurin | |
| 2012/0272643 A1 | 11/2012 | Sherlock | |
| 2012/0279243 A1 | 11/2012 | Endo et al. | |
| 2012/0291433 A1 | 11/2012 | Meng et al. | |
| 2013/0074489 A1 | 3/2013 | Tateno et al. | |
| 2013/0091884 A1 | 4/2013 | Hunt | |
| 2013/0104546 A1 | 5/2013 | Goswami | |
| 2013/0118167 A1 | 5/2013 | Pesce | |
| 2013/0125545 A1 | 5/2013 | Geskes et al. | |
| 2013/0146000 A1 | 6/2013 | Choi et al. | |
| 2013/0255299 A1 | 10/2013 | Hammond | |
| 2013/0263619 A1 | 10/2013 | Kapich | |
| 2013/0269343 A1 | 10/2013 | Kobylecky et al. | |
| 2013/0327042 A1 | 12/2013 | Waterstripe et al. | |
| 2014/0020415 A1 | 1/2014 | Heyl | |

FOREIGN PATENT DOCUMENTS

| | | |
|---|---|---|
| EP | 1669585 A3 | 4/2010 |
| EP | 2180171 A1 | 4/2010 |
| EP | 1504227 B1 | 5/2010 |
| EP | 1892404 A3 | 3/2011 |
| EP | 2021634 B1 | 12/2012 |
| EP | 1961599 B1 | 7/2013 |
| WO | WO2009119185 A1 | 10/2009 |
| WO | WO2009139926 A1 | 11/2009 |
| WO | WO2008125827 A3 | 12/2009 |
| WO | WO2010006319 A2 | 1/2010 |
| WO | WO2010022184 A2 | 2/2010 |
| WO | WO2010024579 A2 | 3/2010 |
| WO | WO2010027360 A2 | 3/2010 |
| WO | WO2010035927 A1 | 4/2010 |
| WO | WO2010045269 A2 | 4/2010 |
| WO | WO2010067359 A2 | 6/2010 |
| WO | WO2010090456 A2 | 8/2010 |
| WO | WO2010102874 A2 | 9/2010 |
| WO | WO2010149277 A2 | 12/2010 |
| WO | WO2011005673 A1 | 1/2011 |
| WO | WO2011007197 A1 | 1/2011 |
| WO | WO2011017767 A1 | 2/2011 |
| WO | WO2011044262 A1 | 4/2011 |
| WO | WO2011048584 A2 | 4/2011 |
| WO | WO2011053895 A1 | 5/2011 |
| WO | WO2011054383 A1 | 5/2011 |
| WO | WO2011058832 A1 | 5/2011 |
| WO | WO2011066964 A2 | 6/2011 |
| WO | WO2011106859 A1 | 9/2011 |
| WO | WO2011120132 A1 | 10/2011 |
| WO | WO2012016873 A1 | 2/2012 |
| WO | WO2012061812 | 5/2012 |
| WO | WO2012064208 A1 | 5/2012 |
| WO | WO2012078195 A1 | 6/2012 |
| WO | WO2012140575 A2 | 10/2012 |
| WO | WO2012159566 A1 | 11/2012 |
| WO | WO2013103654 A1 | 7/2013 |

* cited by examiner

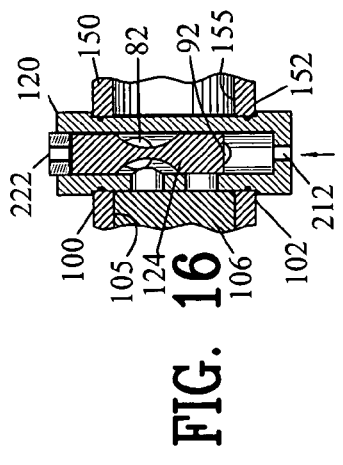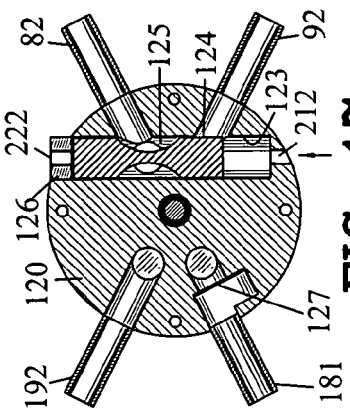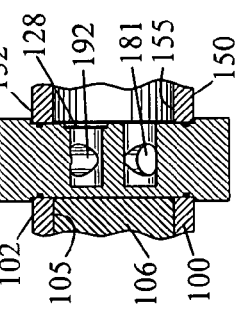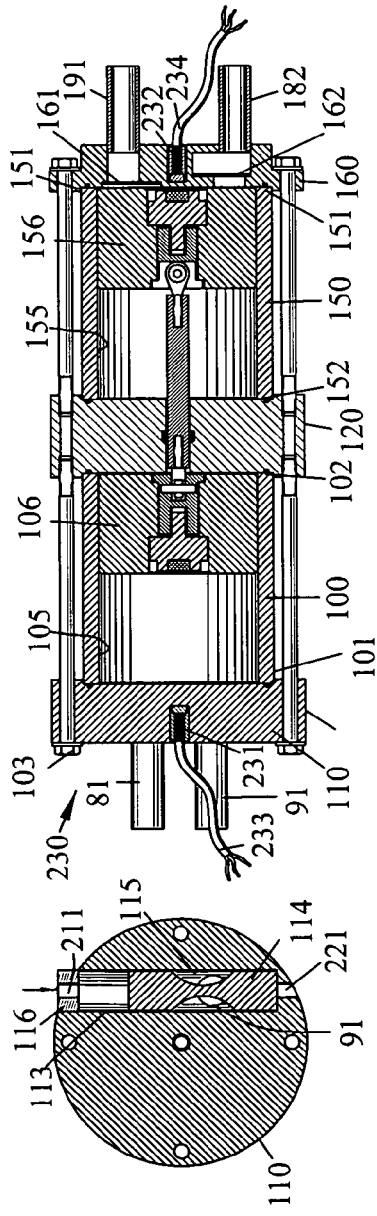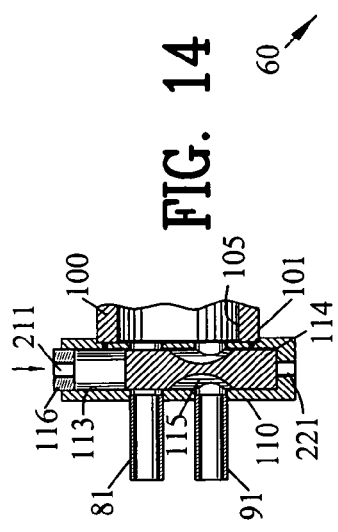

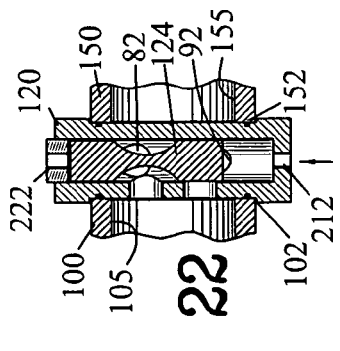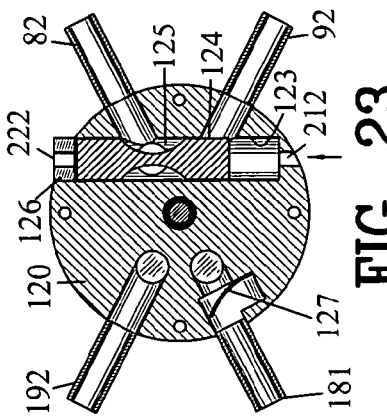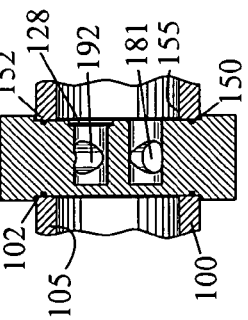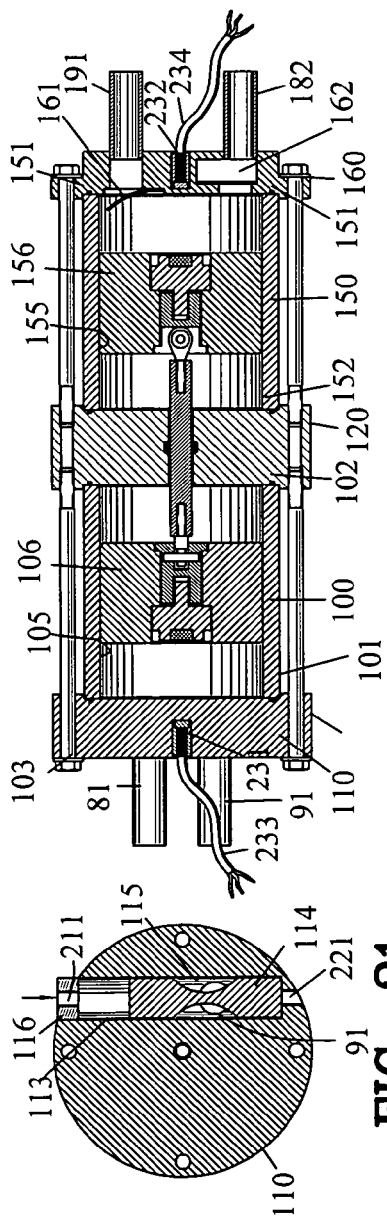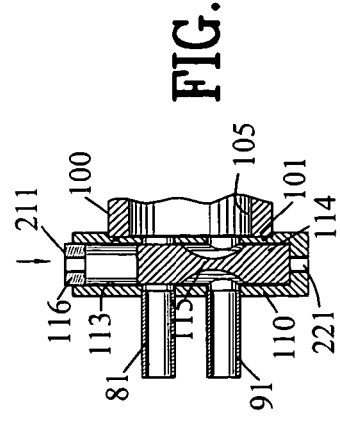

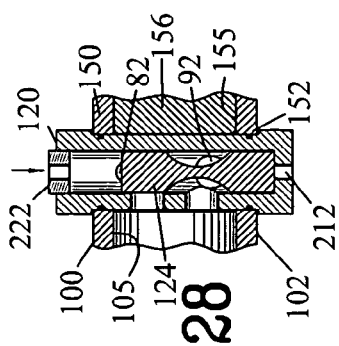
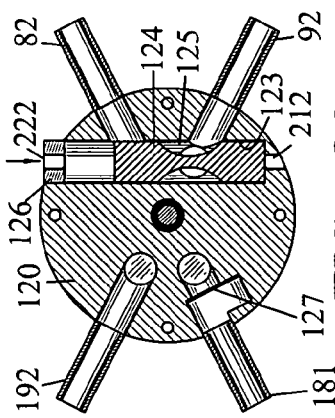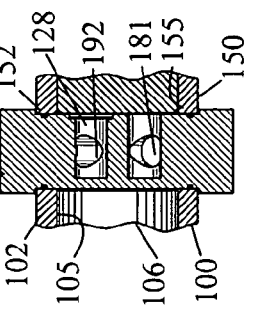
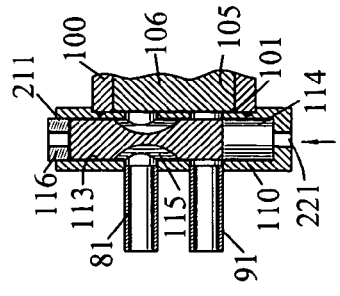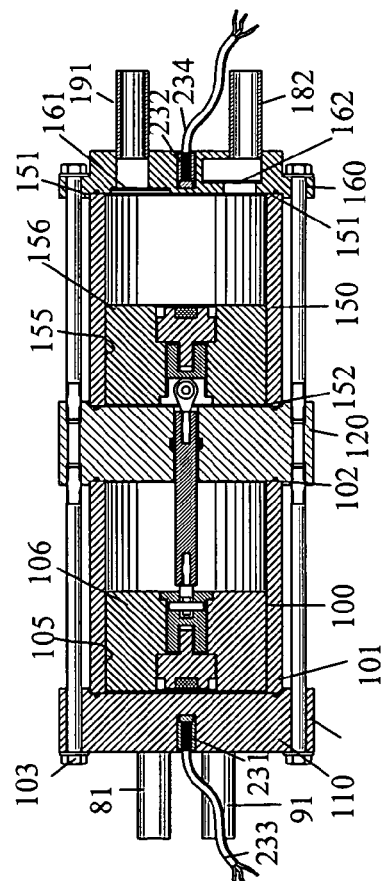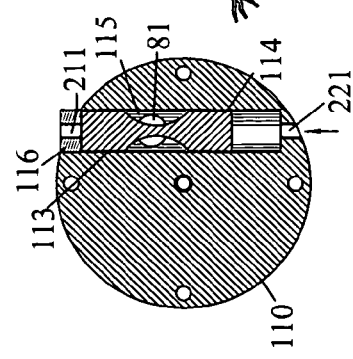

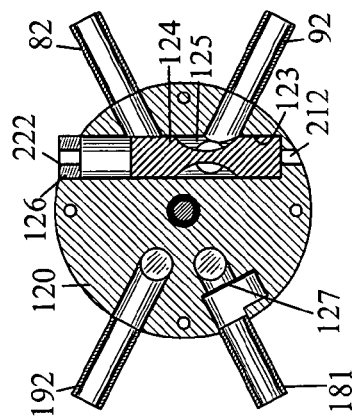
FIG. 34
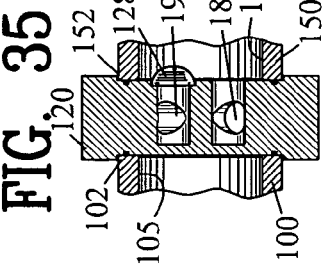
FIG. 35
FIG. 36
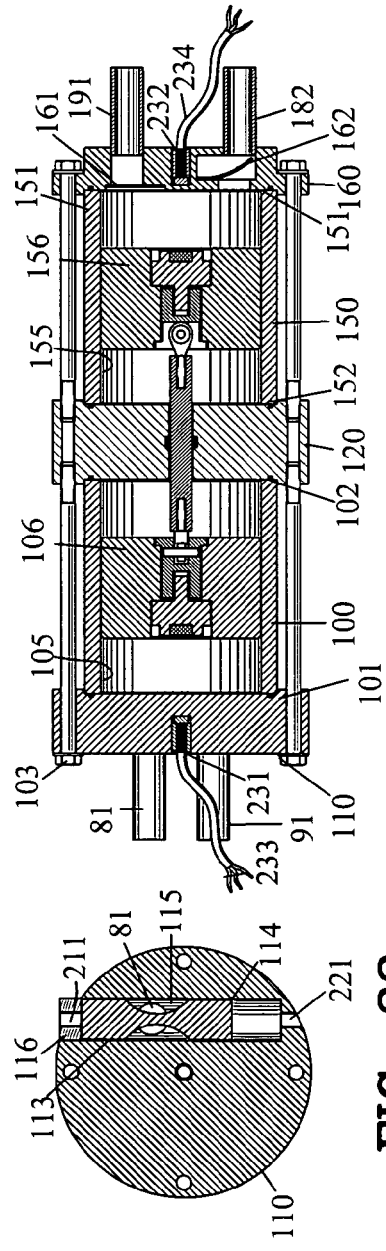
FIG. 31
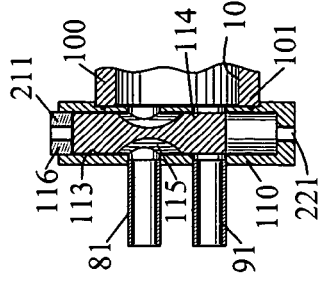
FIG. 32
FIG. 33

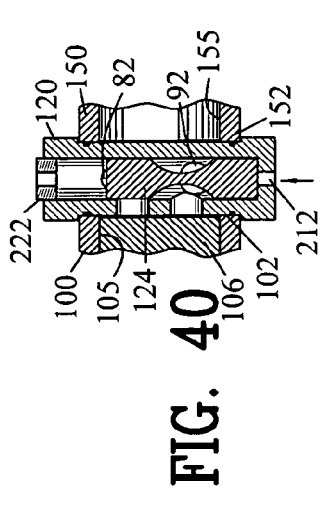
FIG. 40
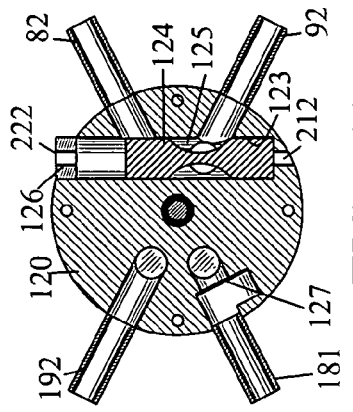
FIG. 41
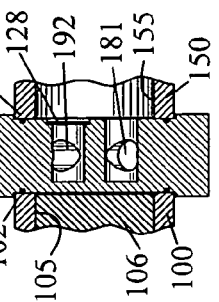
FIG. 42
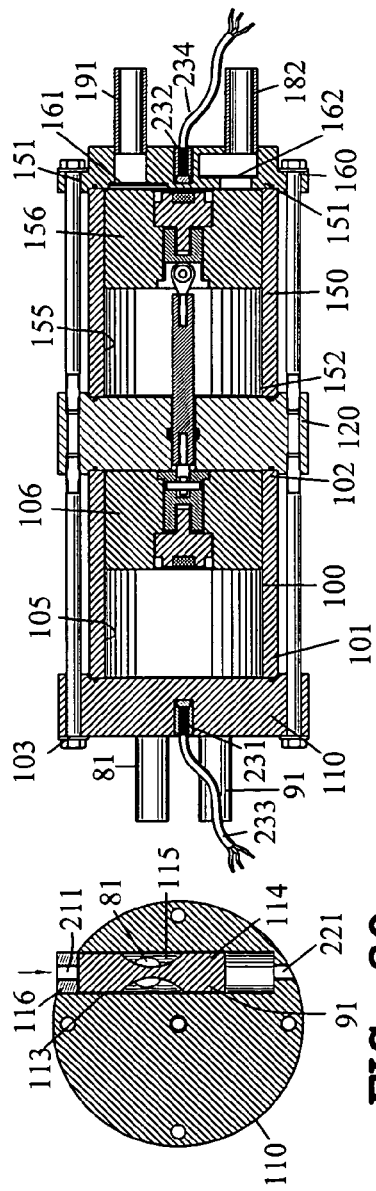
FIG. 37
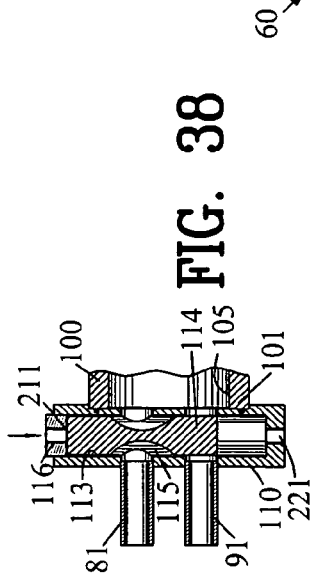
FIG. 38
FIG. 39

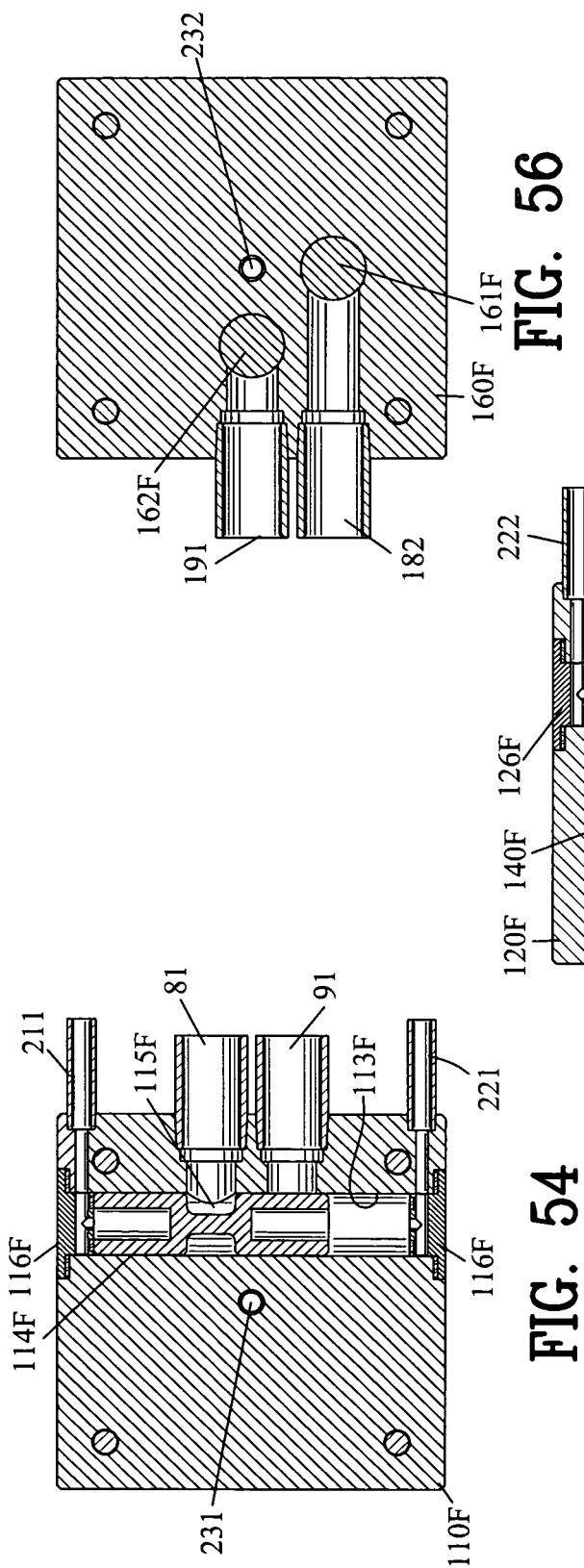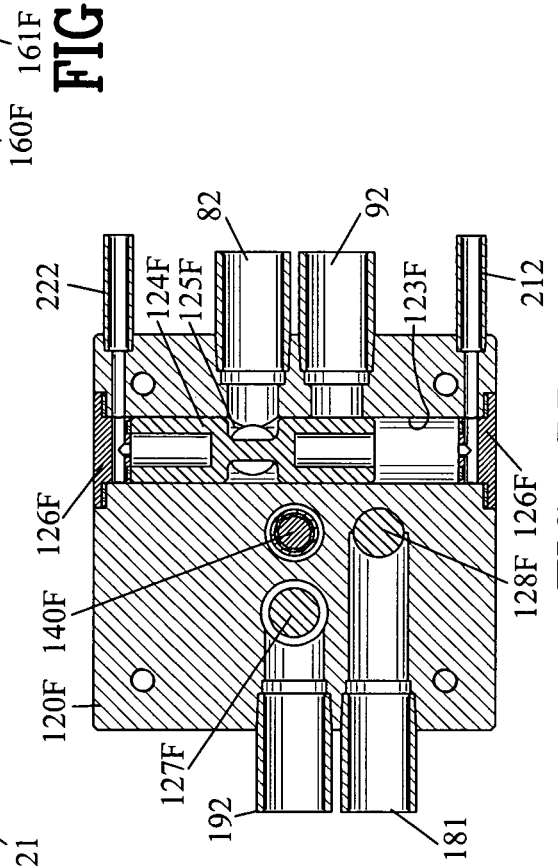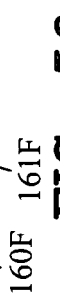

UNIVERSAL HEAT ENGINE

CROSS-REFERENCE TO RELATED APPLICATIONS

This application claims benefit of U.S. Patent Provisional application No. 61/459,331 filed Dec. 10, 2010. All subject matter set forth in provisional application No. 61/459,331 filed Dec. 10, 2010 is hereby incorporated by reference into the present application as if fully set forth herein.

BACKGROUND OF THE INVENTION

1. Field of the Invention

This invention relates to energy transformation and more particularly to a universal heat engine for converting a heat source into a desired output.

2. Description of the Related Art

Modern day transportation of goods depends heavily on both rail and trucking systems. The logistics required to maintain the flow of goods ultimately results in long queues. These queues have resulted in long duration idling of locomotives and trucks along major transportation corridors. Additionally, DOT regulations limit the time long haul trucks can be underway each day. This requires daily layovers for each truck. "Sleeper cabs" enable truck drivers to rest in their trucks. However, they have been required to idle their engines to allow heater or air conditioning systems to function.

The effect of this long duration engine idling has significant deleterious environmental impact. It has been estimated that long duration idling consumes over 1 billion gallons of diesel fuel annually. This results in 11 million tons of carbon dioxide, 200,000 tons of nitrogen oxides and 5,000 tons of particulate matter. In an effort to curb this pollution, "anti-idling" requirements and legislation have been established, which limit the time engine idling is permitted.

Anti-idling requirements have in turn produced new problems for the transportation industry. Climate control for cab occupants now requires a system external to the vehicle drive engine. Heating is most easily accomplished via a diesel fired heater, while air conditioning presents a far greater and more complicated problem. Some have developed battery powered HVAC systems. These systems require an on board battery bank and an inverter to convert 12 volt power to 115 volt AC power. These systems can also run via "shore power". These systems can also be powered via an APU (Auxiliary power unit), which is an onboard diesel generator.

There have been many in the prior art who have attempted to solve these problems with varying degrees of success. None, however completely satisfies the requirements for a complete solution to the aforestated problem. The following U.S. patents are attempts of the prior art to solve this problem.

U.S. Pat. No. 4,666,373 to Sugiura discloses an impeller for a rotary fluid machine of the centrifugal type which is adapted to be constructed as a liquid pump or gas compressor. The impeller comprises a disc having a boss which is fitted on a drive shaft, and a plurality of blades which are uniformly spaced apart circumferentially and axially project from at least one side of the disc. Each blade has a front and a rear surface, and a fluid path is defined between the front surface of a blade and the rear surface of an adjacent blade. The fluid path is arranged to extend from around the boss to the outer periphery of the disc. The width of the fluid path decreases gradually from around the boss toward the outer periphery of the disc, but the fluid path has a constant depth. The front and the rear surface of each blade are substantially arranged along circular arcs having different radii of curvature which are struck from a common center point. Center points associated with different blades are disposed on a single imaginary circle which is concentric with the disc.

U.S. Pat. No. 5,129,236 to Solomon discloses a heat pump system including a power section having a generator for converting a first working fluid from a liquid to a relatively high pressure gas, a power unit providing energy by the conversion of the relatively high pressure gas to relatively low pressure gas to power a drive piston for intermittently delivering a power stroke, a power section condenser converting the first working fluid from relatively low pressure gas to the liquid, a compressor section intermittently driven by the drive piston. The compressor section has a compressor converting relatively low pressure gas second working fluid to relatively high pressure gas second working fluid for circulating the second working fluid through a compressor section condenser and a compressor section evaporator to effect heating and cooling operations. A combined power unit and compressor assembly may be employed which has a valve assembly for introducing the relatively high pressure gas to power the drive piston and for evacuating the relatively low pressure gas therefrom. A condensate pump circulates the liquid in the power section.

U.S. Pat. No. 5,275,014 to Solomon discloses a heat pump system including a power section having a generator for converting a first working fluid from a liquid to a relatively high pressure gas, a power unit providing energy by the conversion of the relatively high pressure gas to relatively low pressure gas to power a drive piston for intermittently delivering a power stroke, a power section condenser converting the first working fluid from relatively low pressure gas to the liquid, a compressor section intermittently driven by the drive piston. The compressor section has a compressor converting relatively low pressure gas second working fluid to relatively high pressure gas second working fluid for circulating the second working fluid through a compressor section condenser and a compressor section evaporator to effect heating and cooling operations. A combined power unit and compressor assembly may be employed which has a valve assembly for introducing the relatively high pressure gas to power the drive piston and for evacuating the relatively low pressure gas therefrom. A condensate pump circulates the liquid in the power section.

U.S. Pat. No. 5,365,908 to Takii, et al. discloses an internal combustion engine and method for operating the engine wherein a leaner than stoichiometric air/fuel ratio is maintained under all running conditions. The desired torque curve is obtained by increasing the amount of boost generated to the intake air charge without enriching the air/fuel mixture. In addition, an anti-knocking system is incorporated that avoids knocking by retarding the spark advance and, at the same time, providing a leaning in the air/fuel mixture.

U.S. Pat. No. 5,509,274 to Lackstrom discloses a high efficiency heat transfer system including a power circuit and heat pump circuit. Each circuit has a working fluid flowing therein. In the power circuit, a heater vaporizes the working fluid which is periodically delivered and exhausted through a valve assembly to a power unit. The power unit is also a compressor for the working fluid in the heat pump circuit. Fluid exhausted from the driven section of the power unit is passed to a four-way valve which selectively delivers the working fluid to an interior coil or an exterior coil to heat or cool an area. In extremely cold ambient temperatures, the area is heated directly from the power circuit using a by-pass exchanger.

U.S. Pat. No. 5,725,365 to Solomon et al. discloses a submersible pump cylinder for immersion in and displacement of a fluid, including a cylindrical housing, a plunger assembly positioned for reciprocating motion within the cylindrical housing, a sealing sleeve assembly attached to the cylindrical housing and to the plunger assembly and overlapped to maintain a convolution which moves during the reciprocating motion of said plunger assembly. A balance valve associated with the plunger assembly maintains pressure within the flexible sleeve, whereby the flexible sleeve is maintained in engagement with the housing and the plunger assembly and substantially without frictional interengagement during motion of the plunger assembly.

U.S. Pat. No. 6,138,649 to Khair, et al. discloses a system for rapidly changing the flow of recirculated exhaust gas to each cylinder of an internal combustion engine operating on diesel fuel or other fuels. The system preferably includes an exhaust gas recirculation line having an exhaust gas recirculation pump along with a reservoir and cooler for storing a desired volume of recirculated exhaust gas. Recirculated exhaust gas is preferably supplied from the reservoir to each cylinder of the associated engine through respective recirculated exhaust gas conduits. A metering valve is preferably disposed within each recirculated exhaust gas conduit immediately adjacent to each cylinder. The metering valves provide uniform distribution of recirculated exhaust gas to the respective cylinders and allow the system to rapidly change the flow of recirculated exhaust gas to each cylinder. The system provides recirculated exhaust gas at a point close to the combustion chamber where it is needed for effective reduction of undesirable emissions.

U.S. Pat. No. 6,167,703 to Rumez, et al. discloses an exhaust gas turbocharger system for an internal combustion engine including a turbine portion with adjustable turbine geometry for powering a compressor portion which delivers a pressurized charge air mass flow to the internal combustion engine air intake. A charge regulator controls the turbine geometry so that the cross-section of exhaust gas flow to the turbine portion is decreased with an increased working load of the internal combustion engine. It is further proposed that at least one heat exchanger is exposed to the charge air circuit so that heated air is fed thereto for heating such as to heat engine lubricating oil.

U.S. Pat. No. 6,467,269 to Dutart discloses a waste gate valve for a turbocharger system in an engine of a work machine, vehicle or the like particularly suitable for operation at changing altitudes. The waste gate valve includes a spring operating against an adjustable spring seat. The adjustable spring seat is adjusted in response to ambient pressure changes to alter the installed length of the spring.

U.S. Pat. No. 6,546,713 to Hidaka, et al. discloses a gas turbine for power generation operated at a turbine nozzle inlet temperature ranging from 1200 to 1650 .degree. C., which is improved to obtain high heat efficiency by making disk blades and nozzles arranged in first to final stages from optimum materials and optimally cooling these disk blades and nozzles, and to obtain a combined power generation system using the gas turbine. The combined power generation system includes a highly efficient gas turbine operated at a turbine nozzle inlet combustion gas temperature ranging from 1200 to 1650 degrees C. and a high pressure-intermediate pressure-low pressure integral type steam turbine operated at a steam inlet temperature of 530 .degree. C. or more, wherein the gas turbine is configured such that turbine blades, nozzles and disks are each cooled, and the blades and nozzles are each made from a Ni-based alloy having a single crystal or columnar crystal structure and disks are made from a martensite steel.

U.S. Pat. No. 6,554,088 to Severinsky et al. discloses a hybrid vehicle comprising an internal combustion engine, a traction motor, a starter motor, and a battery bank, all controlled by a microprocessor in accordance with the vehicle's instantaneous torque demands so that the engine is run only under conditions of high efficiency, typically only when the load is at least equal to 30% of the engine's maximum torque output. In some embodiments, a turbocharger may be provided, activated only when the load exceeds the engine's maximum torque output for an extended period; a two-speed transmission may further be provided, to further broaden the vehicle's load range. A hybrid brake system provides regenerative braking, with mechanical braking available in the event the battery bank is fully charged, in emergencies, or at rest; a control mechanism is provided to control the brake system to provide linear brake feel under varying circumstances.

U.S. Pat. No. 6,625,978 to Eriksson, et al. discloses a device and a method for exhaust gas purification in a combustion engine comprising an arrangement for recirculating exhaust gases from the engine to an air intake thereof. An exhaust gas purification arrangement is adapted to convert constituents in the exhaust gases to less environmentally hazardous substances. A filter arrangement comprises at least one filter adapted to liberate the exhaust gases from particulate constituents. This filter is adapted to purify EGR-exhaust gases only. According to another aspect of the invention, the filter is aged in heat transferring relation to at least one convener unit of the exhaust gas purification arrangement so as to receive, from the convener unit, a heat addition to promote regeneration of the filter by combustion of particulate constituents deposited therein.

U.S. Pat. No. 6,651,432 to Gray, Jr. discloses a method of operating an internal combustion engine wherein intake ambient air is boosted to a higher pressure by passage through at least one compressor and then introduced into the internal combustion engine. Fuel is also introduced into the internal combustion engine for providing combustion in admixture with the air charge at a combustion temperature approximating a target value. Various engine operating parameters, inclusive of torque demand, e.g., accelerator pedal depression, are sensed and the boosted pressure is changed in a manner proportional to a change in the sensed torque demand so as to maintain the combustion temperature at approximately the target value, i.e., below 2100.degree. K.

U.S. Pat. No. 6,732,723 to van Nieuwstadt discloses a method and system for controlling EGR rates of an internal combustion engine including measuring a mass airflow passing to the intake throttle and a desired mass airflow. An error signal is produced representative of a difference between the measured mass airflow and the desired mess airflow. A pair of control signals is produced in response to such produced error signal. One of the pair of control signals is used to adjust the intake throttle to control mass airflow through such intake throttle. The other one of the pair of control signals is used to adjust EGR flow through the EGR valve. The pair of control signals operates the intake throttle and the EGR valve to drive the error signal to a null. In one embodiment, one of the control signals used to adjust the EGR valve is used to provide such adjustment only when the intake throttle is in a position to provide substantially maximum mass airflow through such intake throttle to the intake of the engine. In another embodiment, the pair of control signals operates to drive the throttle to a closed position only when such error signal is unable to be driven towards the null solely from adjustment by the EGR valve.

U.S. Pat. No. 6,739,139 to Solomon discloses a heat pump system including a heat generator, a heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employing compressor working fluid has a compressor cylinder chamber, a compressor piston, and a compressor piston rod, a spacer separating and joining the heat engine piston rod and the compressor piston rod. A sealing assembly is associated with the spacer separating the heat engine working fluid and the compressor working fluid, and a valve assembly communicating with the heat engine cylinder chamber and controlling the ingress and egress of heat engine working fluid to the heat engine.

U.S. Pat. No. 6,896,789 to Ross discloses a system for producing one or more gases for enhancing combustion in an internal combustion engine having an intake. The system comprises: an electrolysis cell, for generating one or more combustion enhancing gases under pressure; a gas conduit, for connecting the electrolysis cell to the internal combustion engine; and a flow regulator, operatively connected between the electrolysis cell and the intake of the engine, for regulating a flow of the combustion enhancing gases to the engine.

U.S. Pat. No. 7,003,964 to Solomon discloses a heat pump system including a heat generator, a heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employs compressor working fluid having a compressor cylinder chamber, a compressor piston, and a compressor piston rod. A spacer separates and joins the heat engine piston rod and the compressor piston rod, and a sealing assembly associated with the spacer separates the heat engine working fluid and the compressor working fluid, and a valve assembly communicates with the heat engine cylinder chamber and controls the ingress and egress of heat engine working fluid to the heat engine.

U.S. Pat. No. 7,207,188 to Solomon discloses a heat pump system including a heat generator, a heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employs compressor working fluid having a compressor cylinder chamber, a compressor piston, and a compressor piston rod. A spacer separates and joins the heat engine piston rod and the compressor piston rod, and a sealing assembly associated with the spacer separates the heat engine working fluid and the compressor working fluid. A valve assembly communicates with the heat engine cylinder chamber and controls the ingress and egress of heat engine working fluid to the heat engine.

U.S. Patent Application 2004/0237562 to Solomon discloses a heat pump system including a heat generator, a heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employs compressor working fluid having a compressor cylinder chamber, a compressor piston, and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

U.S. Patent Application 2006/0117783 to Solomon discloses a heat pump system including a heat generator, a heat engine supplied with heat engine working fluid by the heat generator having a heat engine cylinder chamber, a heat engine piston, and a heat engine piston rod. A preheating chamber employs the heat engine working fluid to heat the heat engine cylinder chamber. A compressor driven by the heat engine employs compressor working fluid having a compressor cylinder chamber, a compressor piston, and a compressor piston rod. A spacer separates and joins the heat engine piston rod and the compressor piston rod. A sealing assembly associated with the spacer separates the heat engine working fluid and the compressor working fluid. A valve assembly communicates with the heat engine cylinder chamber and controls the ingress and egress of heat engine working fluid to the heat engine.

Various other systems have been developed in an attempt to solve this problem, however none has been able to completely answer the need to have an "environmentally friendly" HVAC system which will enable the user to conform to the established anti-idle requirements.

Although the aforementioned prior art have contributed to the development of the art of HVAC systems and electrical generation, none of these prior art patents have solved the needs of this art as applied to the commercial transportation industry.

Therefore, it is an object of the present invention to provide an improved apparatus in the form of a universal heat engine that operates on a differential in temperature.

Another object of this invention is to provide an improved apparatus in the form of a universal heat engine for powering an air conditioning system.

Another object of this invention is to provide an improved apparatus in the form of a universal heat engine for powering an air conditioning system that satisfies anti-idle requirements.

Another object of this invention is to provide an improved apparatus in the form of a universal heat engine for powering an air conditioning system having minimal environmental impact.

Another object of this invention is to provide an improved apparatus in the form of a universal heat engine for driving a linear electrical generator.

Another object of this invention is to provide an improved apparatus that is simple for the operator to use.

Another object of this invention is to provide an improved apparatus in the form of a universal heat engine that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved universal heat engine for converting energy from an input heat source to an output. The universal heat engine comprises a heat engine section and an output section. The heat engine section includes a heat engine bore receiving a heat engine piston. A heat engine valve assembly communicates with the heat engine bore for effecting reciprocal motion of the heat engine piston. The output section includes an output bore receiving an output piston. A piston rod interconnects the heat engine piston to the output piston. A control controls the heat engine valve assemblies to operate the heat engine section in accordance with a desired output from the output section.

The heat source may comprise the burning of a petroleum product, a solar heat source, a geothermal heat source or a byproduct heat source. The output may comprise a static or mobile air conditioning system or an electrical generator.

In one example, the output section may comprise an output compressor for providing a second differential in temperature and pressure of a second fluid. In the alternative, the output section comprises a static or mobile air conditioning system, electrical generator or the like.

In another embodiment, the invention is incorporated into a universal heat engine for converting energy from an input heat source to an output comprising a heat engine section and an output section. The heat engine section includes a heat engine body defining a heat engine bore between a first and a second heat engine body end. A heat engine piston is located in the heat engine bore. A first heat engine valve assembly is secured to the first end of the heat engine body. A second heat engine valve assembly is secured to the second end of the heat engine body. The output section includes an output body defining a output bore extending between a first and a second output body end. An output piston is located in the output bore. A piston rod interconnects the heat engine piston to the output piston. A control controls the first and second heat engine valve assemblies to operate the heat engine section in accordance with a desired output from the output section.

In one specific embodiment, a first and a second spherical bearing is disposed on opposed ends of the piston rod for interconnecting the heat engine piston to the output piston. A seal is interposed between opposed ends of the reciprocating piston rod interconnecting the heat engine piston to the output piston. The seal may comprise a spring energized polymeric seal, a T-type hydraulic seal, a loaded K-type seal or the like.

A sensor senses the position of the heat engine piston within the heat engine bore. The sensor may comprise a hall effect sensor, a mechanical position sensor, an optical sensor, a pressure sensor or the like for sensing the position of the heat engine piston within the heat engine bore.

Each of the first and second heat engine valve assemblies includes a fluid operated shuttle and a one-way reed valve. A solenoid operated control valve directs vapor to operate the vapor operated shuttle valve.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 13 is a reduced sectional view along line 13-13 in FIG. 11 with the universal heat engine located in a first position;

FIG. 14 is a sectional view along line 14-14 in FIG. 11;

FIG. 15 is a sectional view along line 15-15 in FIG. 11;

FIG. 16 is a sectional view along line 16-16 in FIG. 11;

FIG. 17 is a sectional view along line 17-17 in FIG. 11;

FIG. 18 is a sectional view along line 18-18 in FIG. 11;

FIG. 19 is a sectional view similar to FIG. 13 with the universal heat engine located in a second position;

FIG. 20 is a sectional view similar to FIG. 14 with the universal heat engine located in a second position;

FIG. 21 is a sectional view similar to FIG. 15 with the universal heat engine located in a second position;

FIG. 22 is a sectional view similar to FIG. 16 with the universal heat engine located in a second position;

FIG. 23 is a sectional view similar to FIG. 17 with the universal heat engine located in a second position;

FIG. 24 is a sectional view similar to FIG. 18 with the universal heat engine located in a second position;

FIG. 25 is a sectional view similar to FIG. 19 with the universal heat engine located in a third position;

FIG. 26 is a sectional view similar to FIG. 20 with the universal heat engine located in a third position;

FIG. 27 is a sectional view similar to FIG. 21 with the universal heat engine located in a third position;

FIG. 28 is a sectional view similar to FIG. 22 with the universal heat engine located in a third position;

FIG. 29 is a sectional view similar to FIG. 23 with the universal heat engine located in a third position;

FIG. 30 is a sectional view similar to FIG. 24 with the universal heat engine located in a third position;

FIG. 31 is a sectional view similar to FIG. 25 with the universal heat engine located in a fourth position;

FIG. 32 is a sectional view similar to FIG. 26 with the universal heat engine located in a fourth position;

FIG. 33 is a sectional view similar to FIG. 27 with the universal heat engine located in a fourth position;

FIG. 34 is a sectional view similar to FIG. 28 with the universal heat engine located in a fourth position;

FIG. 35 is a sectional view similar to FIG. 29 with the universal heat engine located in a fourth position;

FIG. 36 is a sectional view similar to FIG. 30 with the universal heat engine located in a fourth position;

FIG. 37 is a sectional view similar to FIG. 31 with the universal heat engine located in a fifth position;

FIG. 38 is a sectional view similar to FIG. 32 with the universal heat engine located in a fifth position;

FIG. 39 is a sectional view similar to FIG. 33 with the universal heat engine located in a fifth position;

FIG. 40 is a sectional view similar to FIG. 34 with the universal heat engine located in a fifth position;

FIG. 41 is a sectional view similar to FIG. 35 with the universal heat engine located in a fifth position;

FIG. 42 is a sectional view similar to FIG. 36 with the universal heat engine located in a fifth position;

FIG. 54 is a sectional view along line 54-54 in FIG. 52;

FIG. 55 is a sectional view along line 55-55 in FIG. 52;

FIG. 56 is a sectional view along line 56-56 in FIG. 52;

Similar reference characters refer to similar parts throughout the several Figures of the drawings.

DETAILED DISCUSSION

Figure 1:
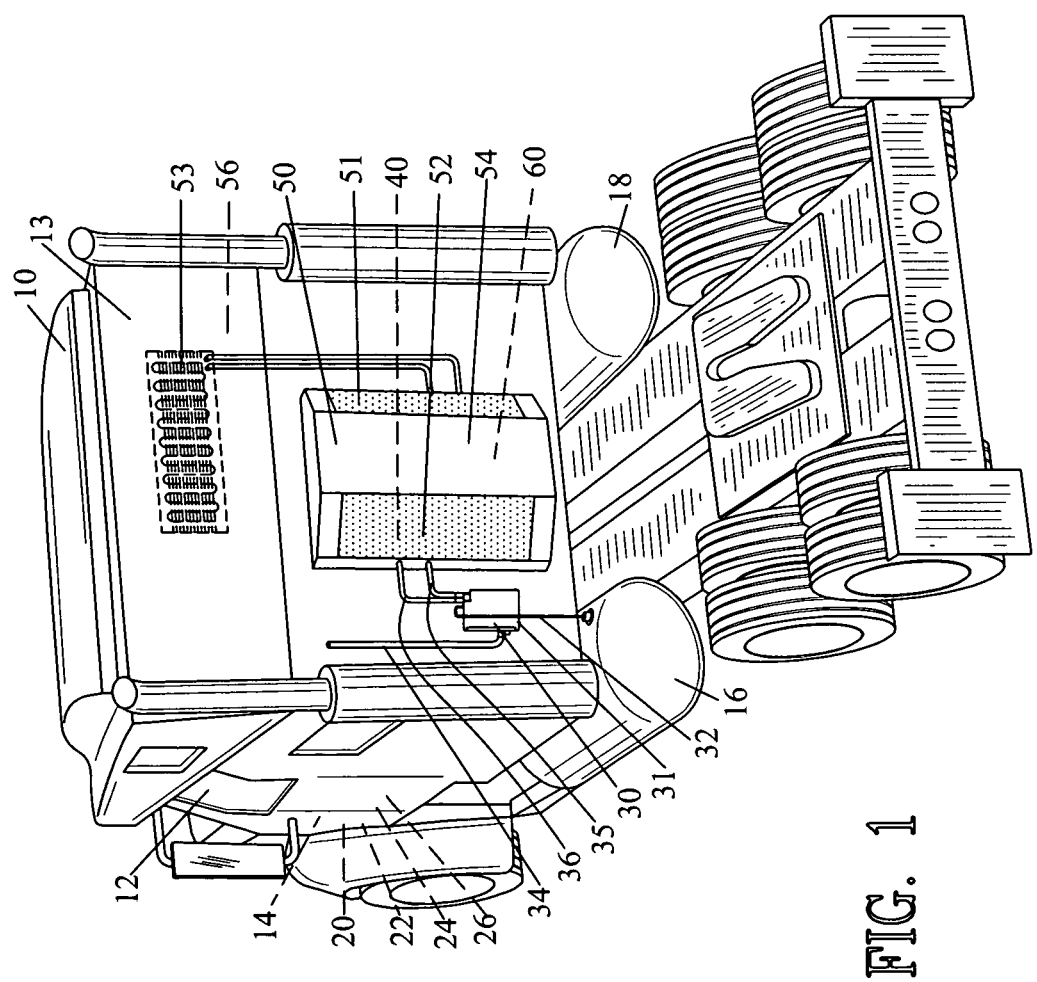
FIG. 1 is a rear isometric view of a motor vehicle shown as a class 8 tractor having a mobile air conditioning system incorporating the universal heat engine of the present invention.

FIG. 1 is a rear isometric view of a vehicle 10 having a passenger compartment or cab 12 having a rear wall 13. In this example, the vehicle 10 is shown as a class 8 truck tractor but it should be understood that the vehicle contemplated in this specification includes land vehicles and sea vessels of every description.

The vehicle 10 is powered by a conventional diesel engine 14 receiving diesel fuel from fuel tanks 16 and 18. The diesel engine 14 includes a cooling system 20 in which a cooling liquid 22 is circulated through the diesel engine 14 to be cooled by a conventional radiator (not shown). A heater 24 is connected to cooling system 20 for heating the passenger compartment 12 in a conventional manner. The heater 24 provides heat in the passenger compartment 12 during operation of the diesel engine 14.

An air conditioning system 26 is powered by the diesel engine 14 in a conventional manner. The air conditioning system 26 provides air conditioning to the passenger compartment 12 during operation of the diesel engine 14.

The heater 24 and the air conditioning system 26 operate to maintain a suitable temperature for the passenger compartment 12 during the operation of the diesel engine 14. The heater 24 and the air conditioning system 26 do not operate during a period of non-operation of the diesel engine 14. Anti-idling regulations restrict the operation of a diesel engine 14 of a vehicle 10 during periods of non-road travel. The present invention incorporates a mobile heater system 30 and a vapor generator 40 as well as a mobile air conditioning system 50 to provide suitable temperature for the passenger compartment 12 during periods of non-operation of the diesel engine 14.

The mobile air conditioning system 50 comprises an engine condenser 51 and an output condenser 52 located outside of the passenger compartment or cab 12 of the vehicle 10. An output evaporator 53 is located within the passenger compartment or cab 12 of vehicle 10. The engine condenser 51 and output condenser 52 are mounted within a mobile air conditioning module 54 secured to the rear wall 13 of the passenger compartment or cab 12 of the vehicle 10. The engine condenser 51 and the output condenser 52 are angularly mounted on opposed sides of the mobile air conditioning module 54 for ensuring that the mobile air-conditioning system 50 will not interfere with the turning of the vehicle 10. A thermostat 56 provides a temperature input to the mobile heater system 30. and the mobile air conditioning system 50.

The universal heat engine 60 of the present invention is located within the mobile air conditioning module 54 for powering the mobile air-conditioning system 50 during non-operation of the diesel engine 14. The mobile air-conditioning system 50 provides air conditioning to the passenger compartment 12 in compliance with anti-idling regulations.

Figure 2:
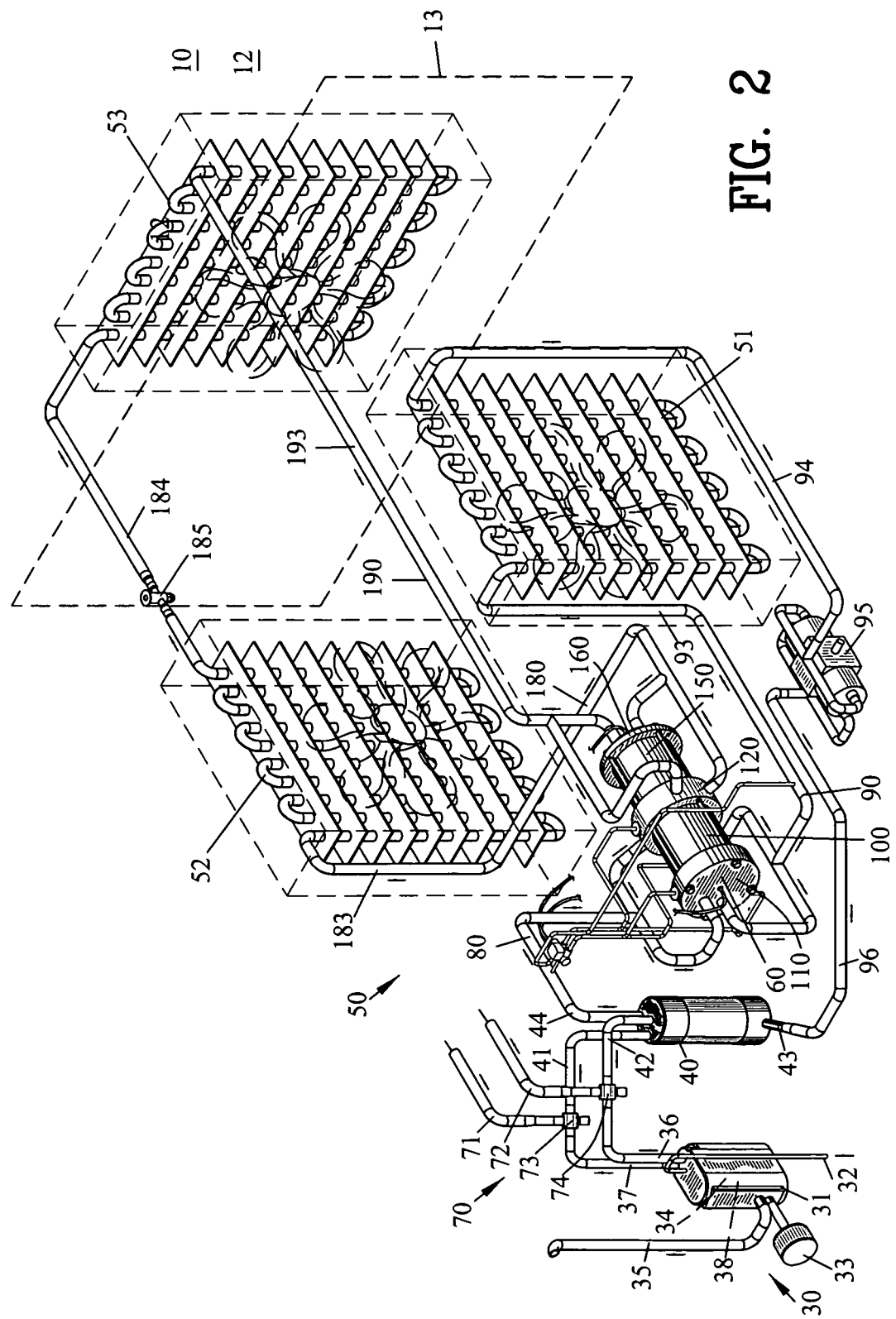
FIG. 2 is a detailed isometric view of the mobile air conditioning system of FIG. 1.

FIG. 2 is a detailed isometric view of the mobile heater system 30 as well as a mobile air conditioning system 50 of FIG. 1. The mobile heater system 30 provides heat for the passenger compartment 12 during periods of non-operation of the diesel engine 14 as well as providing an input heat source to the mobile air conditioning system 50.

In this embodiment, the mobile heater system 30 comprises a hydronic heater 31 having a diesel fuel input 32 and an air input 33. A diesel burner 34 is located within the hydronic heater 31 for burning diesel fuel from the diesel fuel input 32. Vapors from the burnt diesel fuel are expelled through a diesel exhaust 35.

The hydronic heater 31 includes a liquid input 36 and a liquid output 37 with a liquid pump 38 located therebetween. The hydronic heater 31 heats a liquid entering the liquid input 36 and discharges in the liquid from the liquid output 37 through the operation of the liquid pump 38. The hydronic heater 31 provides heated liquid by burning diesel fuel during non-operation of the diesel engine 14.

The mobile heater system 30 is connected to a vapor generator 40. In this embodiment, the liquid input 36 and the liquid output 37 of the hydronic heater 31 are connected to a primary liquid input 41 and a primary liquid output 42 of the vapor generator 40. The heated liquid flowing through the primary liquid input and output 41 and 42 exchanges heat with a fluid flowing between a secondary liquid input 43 and a secondary liquid output 44. A more detailed explanation of the vapor generator 40 appears hereinafter with reference to FIGS. 4-7. The vapor generator 40 functions as a vapor source having a high pressure vapor supply 44 and a low pressure vapor return 43.

In this example, the mobile heater system 30 includes an optional cooling system coupling 70. The cooling system coupling 70 includes a liquid input 71 and a liquid output 72 connecting the cooling system 20 of the diesel engine 14 to the vapor generator 40. An input valve 73 and an output valve 74 select an input to the vapor generator 40 between the hydronic heater 31 and the cooling system 20 of the diesel engine 14. Heated liquid from the hydronic heater 31 is used during non-operation of the diesel engine 14 whereas heated liquid from the cooling system 20 of the diesel engine 14 may be used to supplement or replace the conventional air-conditioning system 26 during operation of the vehicle 10.

Figure 3:
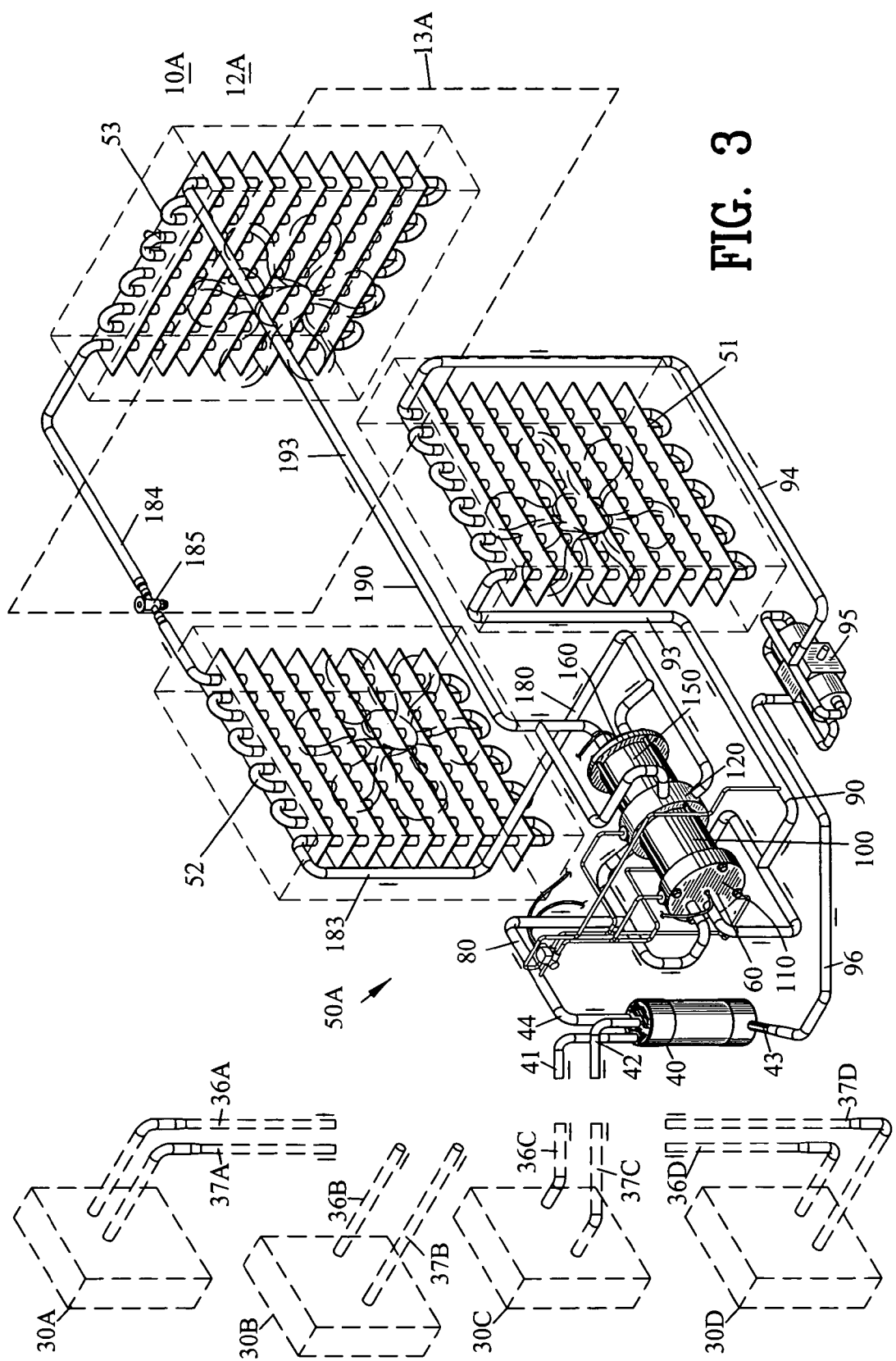
FIG. 3 is an isometric view similar to FIG. 2 illustrating a static air conditioning system incorporating the universal heat engine of the present invention.
Figure 4:
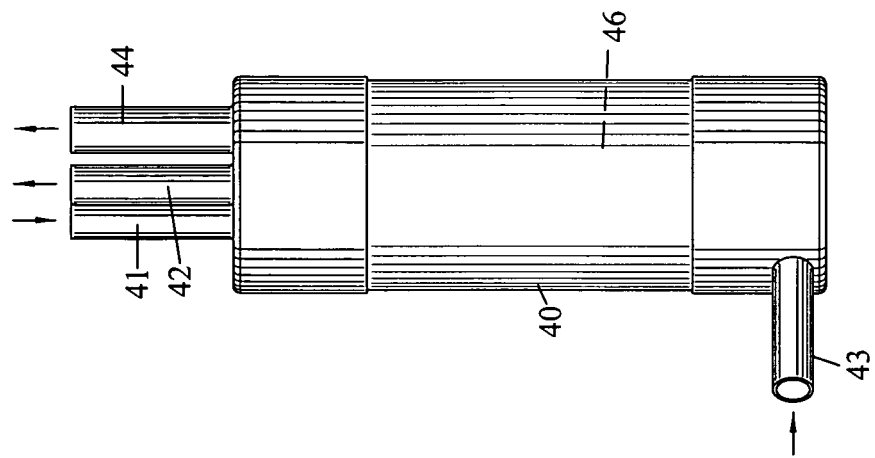
FIG. 4 is an enlarged isometric view of the vapor generator of FIG. 2.
Figure 5:
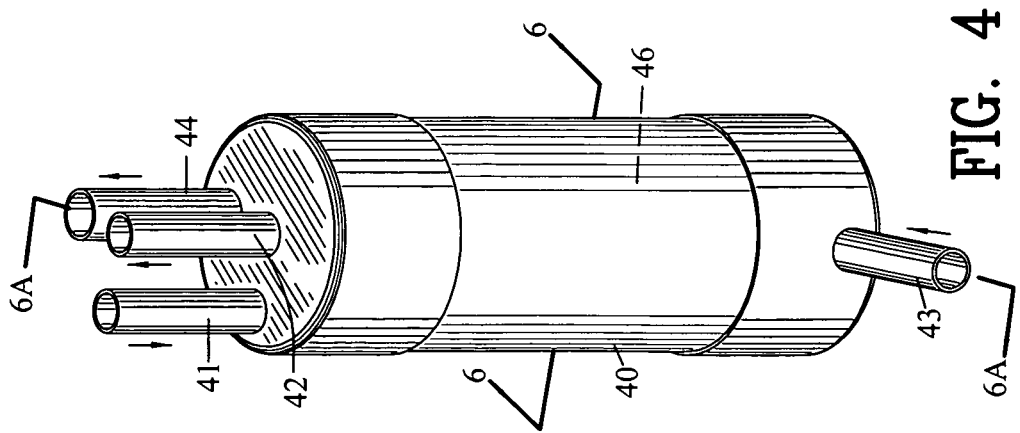
FIG. 5 is a side view of FIG. 4.
Figure 7:
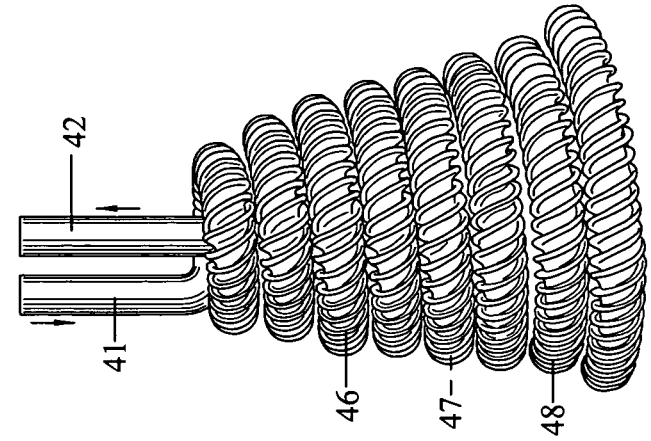
FIG. 7 is an enlarged side view of a core of the vapor generator of FIGS. 4-6.
Figure 6A:
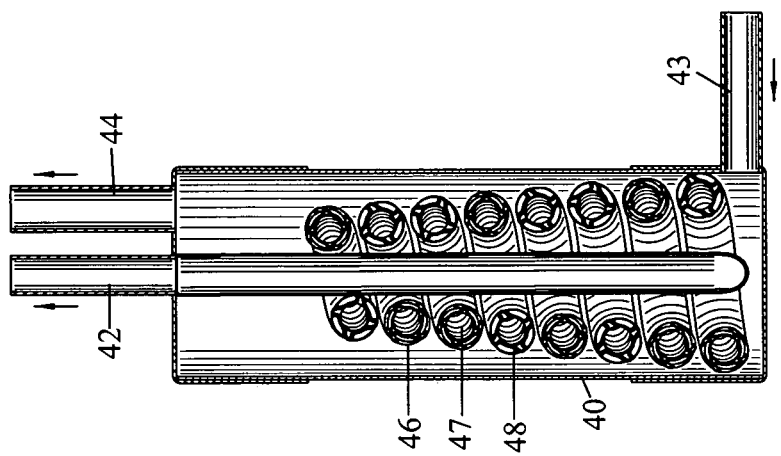
FIG. 6A is a sectional view along line 6A-6A in FIG. 4.
Figure 6:
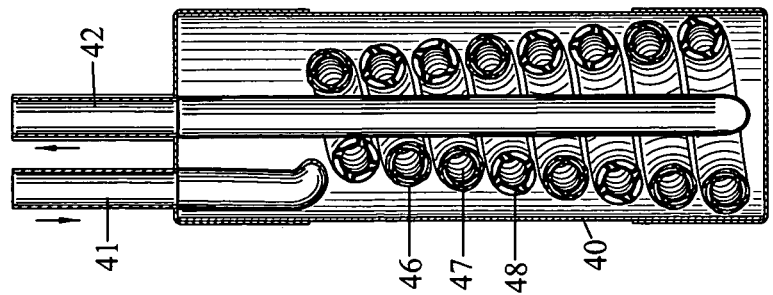
FIG. 6 is a sectional view along line 6-6 in FIG. 4.

FIG. 3 is an isometric view similar to FIG. 2 illustrating an alternate air conditioning system 50A incorporating the universal heat engine 60 of the present invention. The alternate air conditioning system 50A may be installed on virtually any type of structure 10A lacking the diesel engine 14 found in the vehicle 10. The structure 10A may include a static structure such as a home, building or the like. In addition, the structure 10A may include a mobile structure lacking the diesel engine 14 or electricity such as portable office, shipping container, a refrigerated compartment or the like.

FIG. 3 illustrates is various examples of sources of heat to produce a differential in liquid temperature for powering the universal heat engine 60 of the present invention. A heat source 30A is a representative of a burner for burning a petroleum product such as natural gas, propane and the like. A heat source 30B is a representative of a geothermal heat source. A heat source 30C is a representative of a solar heat source. A heat source 30D is a representative of a byproduct heat source. It should be appreciated by those skilled in the art that the heat source for powering the universal heat engine 60 of the present invention should not be limited to the specific alternate examples of sources of heat set forth therein. The remainder of the apparatus of FIG. 3 is identical to FIG. 2.

FIGS. 4-7 are enlarged views of the vapor generator 40 of FIGS. 2 and 3. Heated liquid enters into the primary liquid, input 41 and passes adjacent to a core 46 prior to exiting from the primary liquid output 42. The fluid enters the secondary liquid input 43 and passes through a lumen 47 within the core 46 to exit from the secondary vapor output 44. A helical surface fin 48 is helically wound about the core 46 to increase the surface area of the core 46 for increasing the transfer of heat between the liquid entering the primary liquid input 41 and the fluid exiting the secondary vapor output 44. The vapor generator 40 functions as a vapor source having a high pressure vapor supply 44 and a low pressure vapor return 43.

Figure 8:
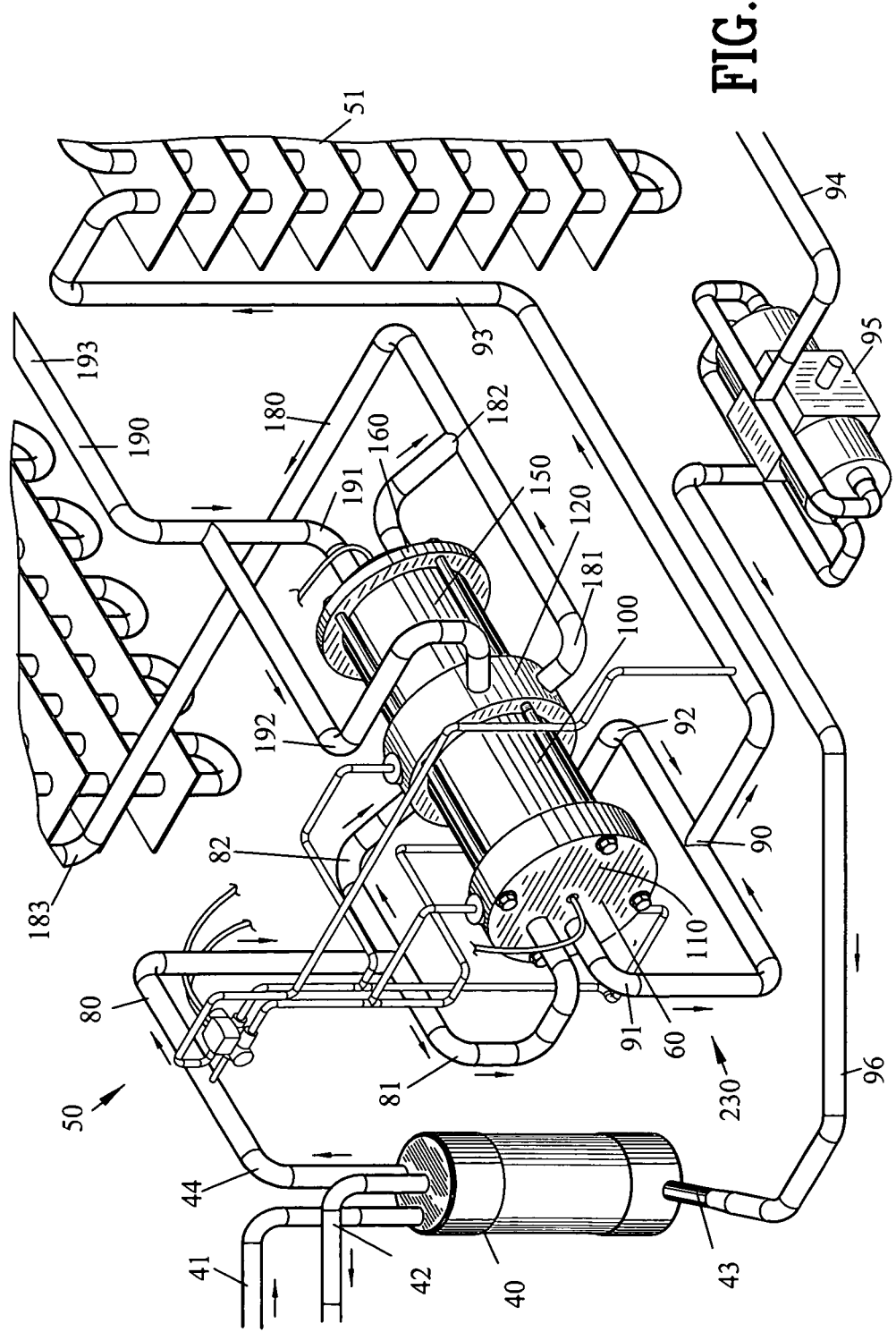
FIG. 8 is an enlarged view of a portion of FIG. 2.

FIG. 8 is an enlarged view of a portion of FIG. 2 illustrating the universal heat engine 60 in greater detail. An engine section input system 80 interconnects the vapor generator 40 with the universal heat engine 60. An engine section output system 90 interconnects the universal heat engine 60 the engine condenser 51.

The universal heat engine 60 comprises an engine section 100 and an output section 150. The universal heat engine 60 further comprises valve assemblies including an engine section valve assembly 110, a central valve assembly 120 and an output section valve assembly 160.

The engine section input system 80 comprises a first and a second engine section input 81 and 82 connected to the engine section 100 of the universal heat engine 60. The first and second engine section input 81 and 82 are connected to the engine valve assembly 110 and the central valve assembly 120, respectively, of the universal heat engine 60. The engine section output system 90 comprises a first and a second engine section output 91 and 92 connected to the engine condenser 51 by conduit 93. The first and second engine section output 91 and 92 are connected to the engine valve assembly 110 and the central valve assembly 120, respectively, of the universal heat engine 60. Fluid is returned from the engine condenser 51 through conduit 94, condensate pump 95 and conduit 96 to the fluid input 43 of the vapor generator 40.

An output section output system 180 comprises a first and a second output section output 181 and 182 connected to the output section 150 of the universal heat engine 60. The first and second output section outputs 181 and 182 are connected to the central valve assembly 120 and the output valve assembly 160, respectively, of the universal heat engine 60. The first and second output section outputs 181 and 182 are connected through conduit 183 to the output condenser 52 as best shown in FIG. 2. The output condenser 52 is connected through conduit 184 to the output evaporator 53. A metering device 185 is interposed in conduit 184 between the output condenser 52 and the output evaporator 53.

An output section input system 190 comprises a first and a second output section input 191 and 192 connected to the output section 150 of the universal heat engine 60. The first and second output section input 191 and 192 are connected to the central valve assembly 120 and the output valve assembly 160, respectively, of the universal heat engine 60. The first and second output section input 191 and 192 are connected through conduit 193 to the output evaporator 53

Figure 9:
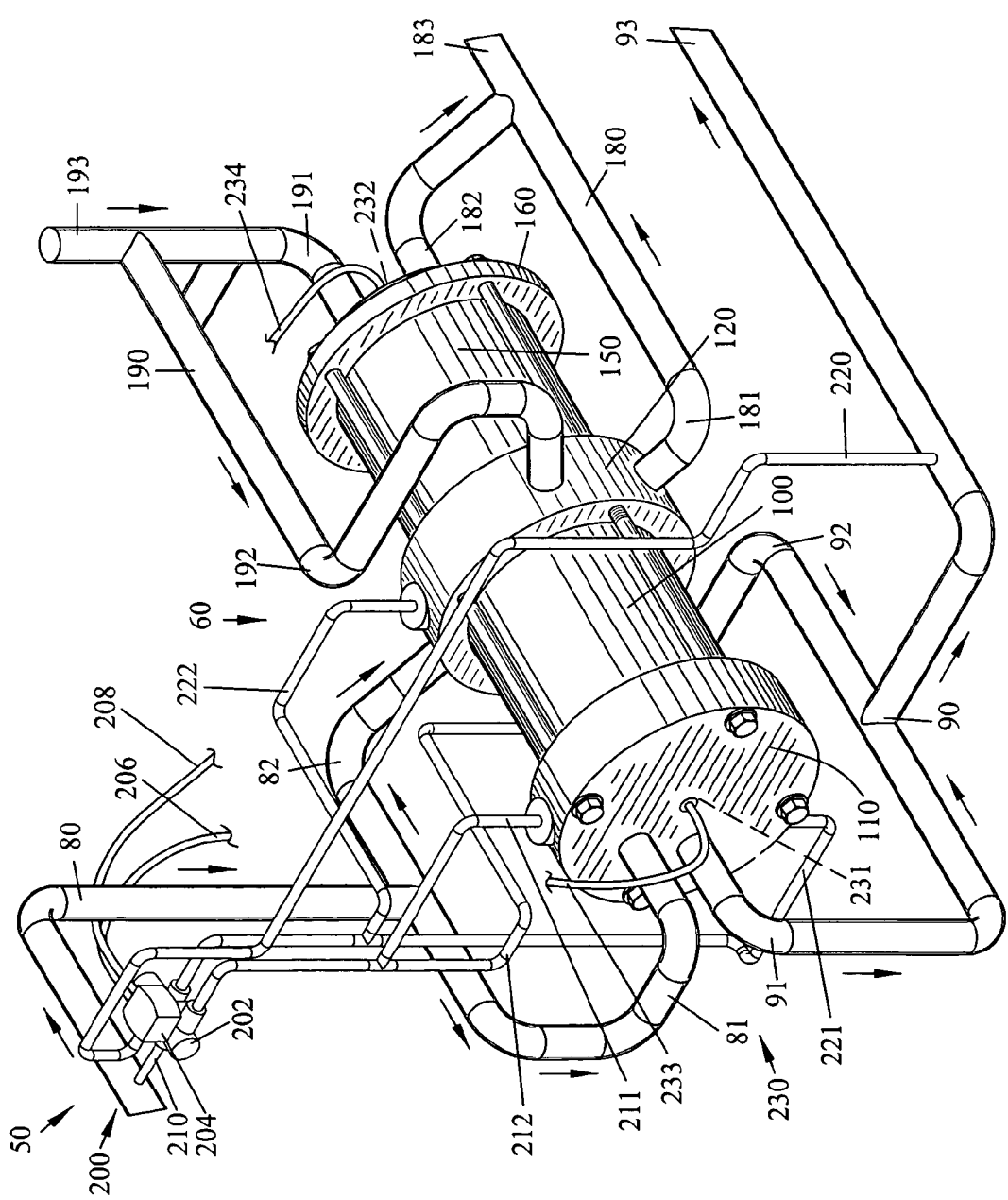
FIG. 9 is a magnified view of a portion of FIG. 8.

FIG. 9 is a magnified view of a portion of FIG. 8 illustrating a valve actuator system 200 for the universal heat engine 60. The valve actuator system 200 comprises a shuttle valve 202 operated by a valve actuator 204. The valve actuator 204 is connected by connectors 206 and 208 to a logic board shown in FIG. 47 as will be described in greater detail hereinafter. The valve actuator 204 moves the shuttle valve 202 between a first position and a second position (not shown). Preferably, the valve actuator 204 is a solenoid operated by the valve control 206.

A high pressure supply line 210 is connected to the engine section input system 80 whereas a low pressure supply line 220 is connected to the engine section output system 90. Supply lines 211 and 212 connect the shuttle valve 202 to the engine valve assembly 110 and the central valve assembly 120, respectively. Similarly, supply lines 221 and 222 connect the shuttle valve 202 to the engine valve assembly 110 and the central valve assembly 120, respectively. The shuttle valve provides high and low fluid pressure to supply lines 211 and 221 when the shuttle valve in the first position (not shown) and provide low and high fluid pressure to supply lines 211 and 221 when the shuttle valve in the second position (not shown). The valve actuator system 200 operates the universal heat engine 60 as will be described in greater detail hereinafter.

An engine section sensor 231 and an output section sensor 232 are located in the engine valve assembly 110 and the output valve assembly 160, respectively. The engine section sensor 231 and the output section sensor 232 sense the position of the engine piston 106 and the output piston 156. Connectors 233 and 234 connect the engine section sensor 231 and the output section sensor 232 to the logic board shown in FIG. 47.

Figure 10:
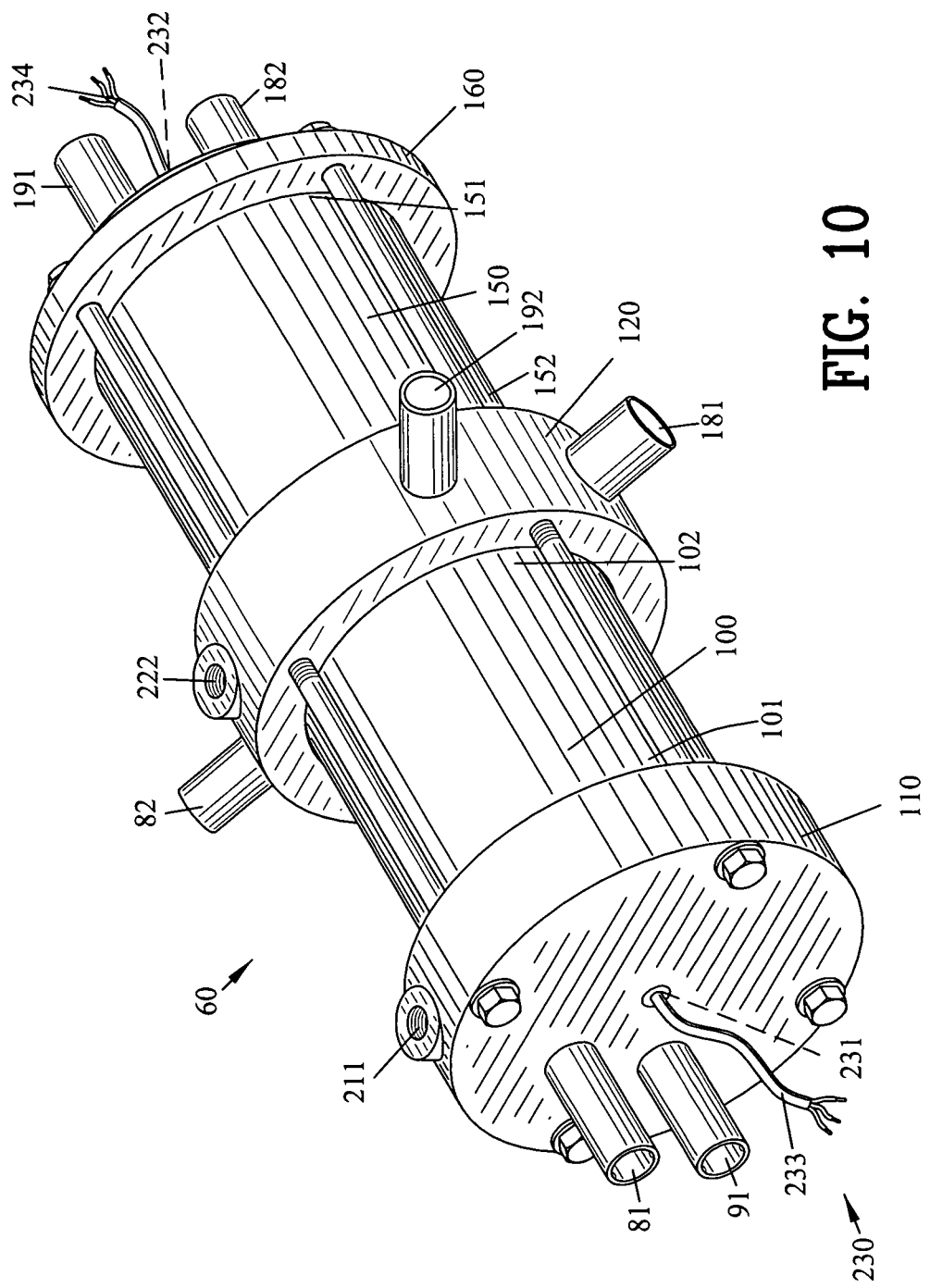
FIG. 10 is an isometric view of the universal heat engine of the present invention.
Figure 11:
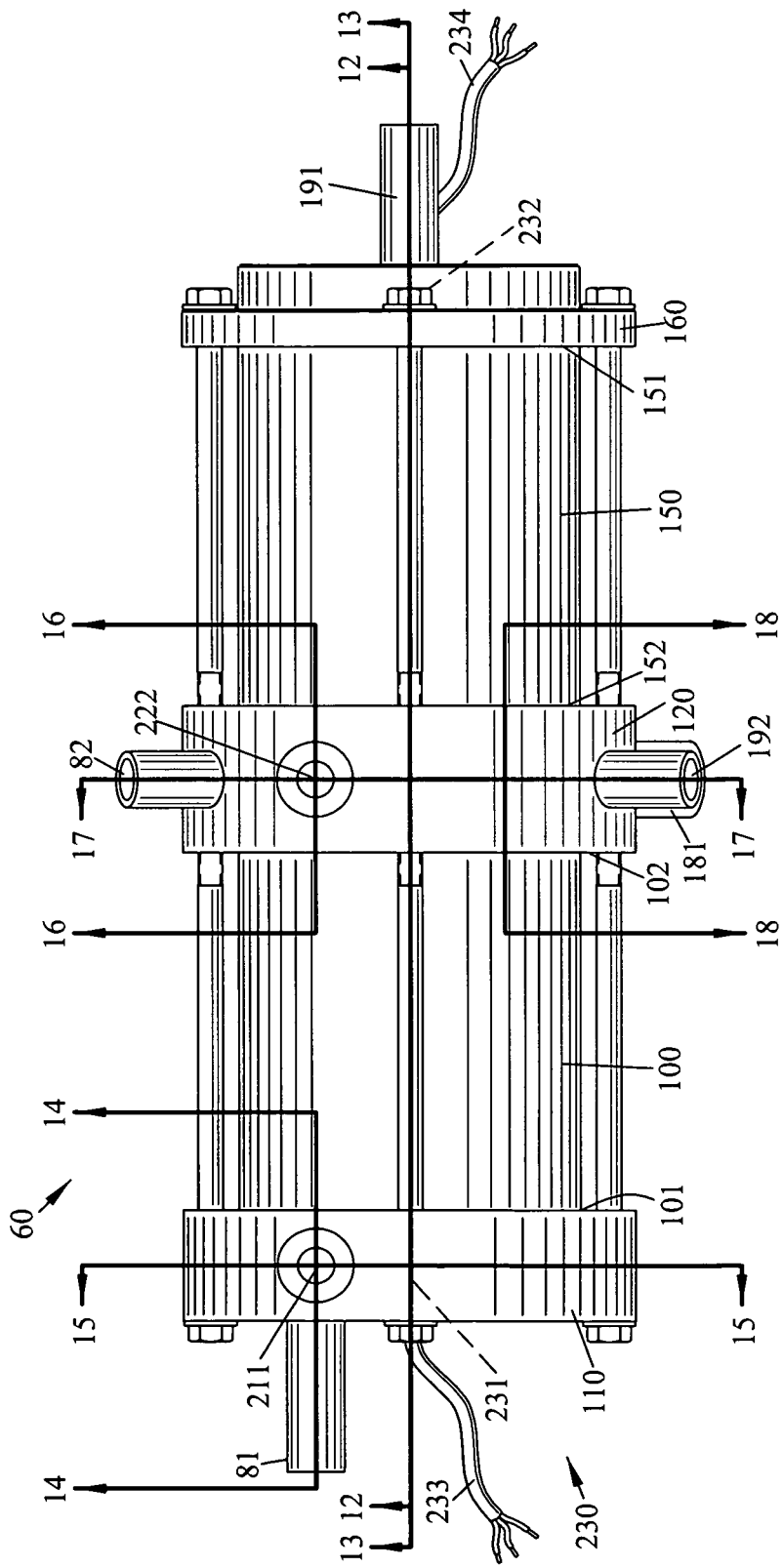
FIG. 11 is a side view of the universal heat engine of FIG. 10.
Figure 12:
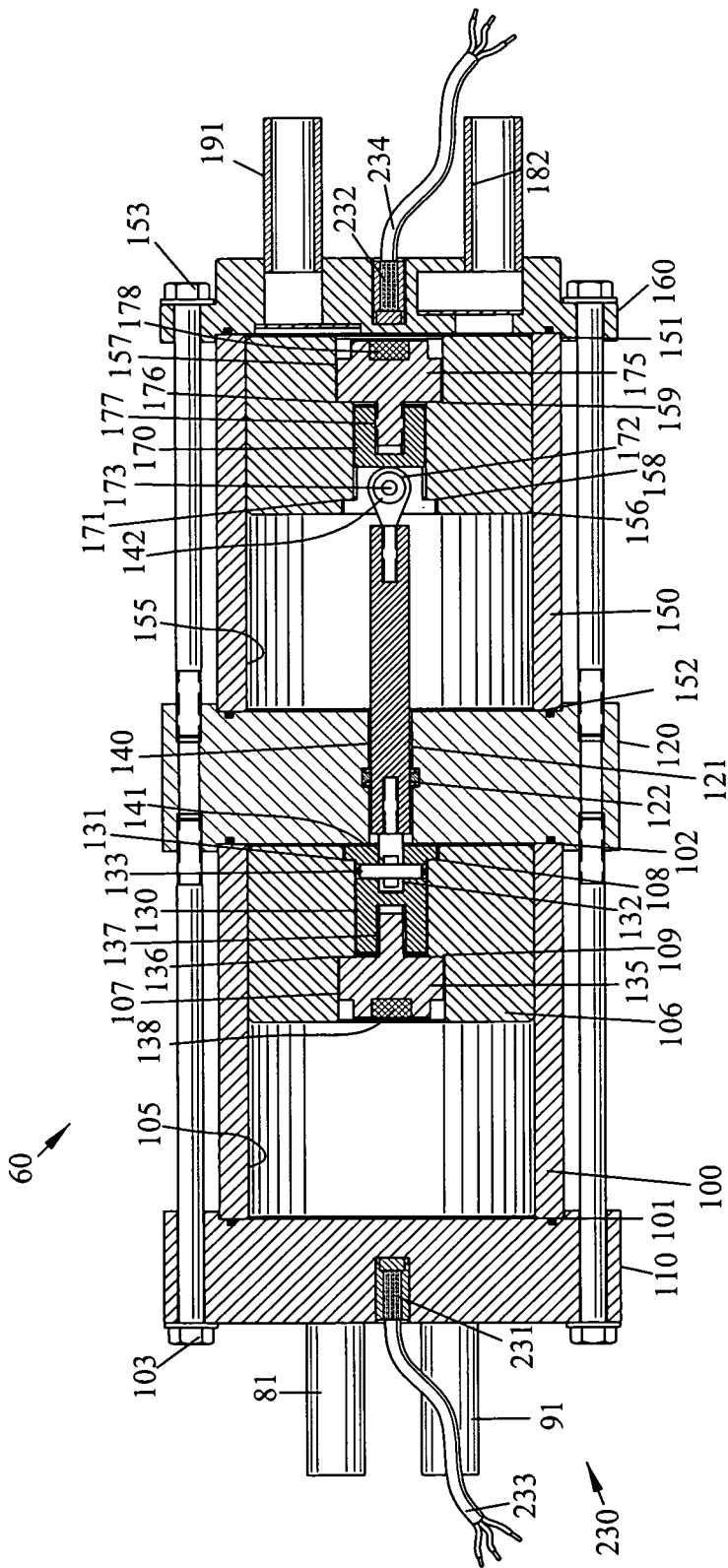
FIG. 12 is a sectional view along line 12-12 in FIG. 11.

FIGS. 10-12 are various views of the universal heat engine 60 of the present invention. The universal heat engine 60 of the present invention is an improvement of U.S. Pat. Nos. 5,275,014, 6,739,139, 7,003,964 and 7,207,188 to Solomon which are incorporated by reference as if fully set forth herein.

The engine section 100 of the universal heat engine 60 extends between a distal end 101 and a proximal end 102. The distal end 101 is sealed to the engine valve assembly 110. The proximal end 102 is sealed to the central valve assembly 120. The engine section 100 is secured to the engine valve assembly 110 and the central valve assembly 120 by fasteners 103 threaded into the central valve assembly 120. The engine section 100 defines a bore 105. An engine piston 106 is located within the bore 105 for reciprocal movement therein. The engine piston 106 includes a through aperture 107 defining shoulders 108 and 109.

The output section 150 of the universal heat engine 60 extends between a distal end 151 and a proximal end 152. The distal end 151 is sealed to the output section about assembly 160 whereas the proximal end 152 is sealed to the central valve assembly 120. The output section 150 is secured to the output section valve assembly 160 and the central valve assembly 120 by fasteners 153 threaded into the central valve assembly 120. The output section 151 defines a bore 155. An output piston 156 is located within the bore 155 for reciprocal movement therein. The output piston 156 includes a through aperture 157 defining shoulders 158 and 159.

A connecting rod 140 interconnects the engine piston 106 to the output piston 156 through an engine coupling 130 and an output coupling 170. The connecting rod 140 includes an engine spherical bearing 141 and an output spherical bearing 142. The connecting rod 140 extends through a central aperture 121 in the central valve assembly 120. A seal 122 is provided for sealing the engine bore 105 from the output bore 155. The shaft 140 may be coated with a resilience polymeric material such as Teflon or the like.

The engine coupling 130 including a coupling shoulder 131 is received within the aperture 107 of the piston 106 with a coupling shoulder 131 engaging with the shoulder 108 of the piston 106. The engine coupling 130 defines a bearing receiver 132 for receiving the spherical bearing 141 of the connecting rod 140. A bearing pin 133 secures the spherical bearing 141 to the engine coupling 130. It should be understood at the bearing pin 133 secures the spherical bearing 141 to the engine coupling 130 prior to the engine coupling 130 being inserted within the aperture 107 of the engine piston 106.

An engine retainer 135 is inserted from the opposite side of the engine piston 106 with an engine retainer shoulder 136 engaging with the shoulder 109 of the engine piston 106. The engine retainer 135 is secured to the engine coupling 130 through a threaded engagement 137. The threaded engagement 137 ensures that the engine coupling 130 and the engine retainer 135 are fixed to the engine piston 106. The engine retainer 135 supports a magnet 138 for cooperating with the sensor 231 for sensing the position of the engine piston 106 within the engine bore 105.

The output coupling 170 including a coupling shoulder 171 is received within the aperture 157 of the piston 156 with a coupling shoulder 171 engaging with the shoulder 158 of the piston 156. The output coupling 170 defines a bearing receiver 172 for receiving the spherical bearing 142 of the connecting rod 140. A bearing pin 173 secures the spherical bearing 142 to the output coupling 170.

An output retainer 175 is inserted from the opposite side of the output piston 156 with an output retainer shoulder 176 engaging with the shoulder 159 of the output piston 156. The output retainer 175 is secured to the output coupling 170 through a threaded engagement 177. The threaded engagement 177 ensures that the output coupling 170 and the output retainer 175 are fixed to the output piston 156. The output retainer 175 supports a magnet 178 for cooperating with the sensor 232 for sensing the position of the output piston 156 within the output bore 155.

FIGS. 13-18 are various views of the universal heat engine 60 of the present invention with the universal heat engine 60 located in a first position. The engine piston 106 and the output piston 156 are disposed in the maximum right position.

FIGS. 14 and 15 are sectional views illustrating the engine valve assembly 110. The engine valve assembly 110 includes a valve bore 113 slidably receiving a valve 114. The shuttle valve 114 is substantially cylindrical having a region of reduced area defining a shuttle valve flow region 115. A threaded cap 116 retains the shuttle valve within the valve bore 113. The supply lines 211 and 221 communicate with opposite ends of the valve bore 113. A differential in fluid pressure between the supply lines 211 and 221 will move the shuttle valve 114 within the valve bore 113.

FIGS. 16-18 are sectional views illustrating the central valve assembly 120. The central valve assembly 120 includes a valve bore 123 slidably receiving a shuttle valve 124. The shuttle valve 124 is substantially cylindrical having a region of reduced area defining a shuttle valve flow region 125. A threaded cap 126 retains the shuttle valve within the valve bore 123. The supply lines 212 and 222 communicate with opposite ends of the valve bore 123. A differential in fluid pressure between the supply lines 212 and 222 will move the shuttle valve 124 within the valve bore 123.

The shuttle valves 114 and 124 control fluid pressure of a first fluid directed to the engine section 100 of the universal heat engine 60. The first fluid flows in a closed path between the engine section 100, the engine condenser 51 and a vapor generator 40. Control of the fluid pressure of the first fluid to the engine section 100 results in reciprocation of the engine piston 106 and the output piston 156 within the bores 105 and 155 respectively.

FIGS. 17 and 18 are sectional views illustrating reed valves 127 and 128 located within the central valve assembly 120. The reed valve 127 is located in proximity to the first output section output 181 whereas the reed valve 128 is located in proximity to the second output section input 192. The reed valves 127 and 128 are one-way valves operated by applied pressure to the surface of the reed valves 127 and 128.

FIG. 13 is a sectional view illustrating reed valves 161 and 162 located within the output section valve assembly 160. The reed valve 161 is located in proximity to the first output section input 191 whereas the reed valve 162 is located in proximity to the second output section output 182.

A second fluid flows in a closed path between the output section 150, the output condenser 52 and the output evaporator 53. The reed valve 127 and 128 in combination with the reed valves 161 and 162 control the direction of flow of the second fluid in vapor form from the output section 150 of the universal heat engine 60. The fluid flow of the second fluid from the output section 150 through the output condenser 52, the metering device 185 and the output evaporator 53 results in air conditioning or refrigeration of a desire space. The second fluid operates in accordance with the Carnot cycle as should be well known to those skilled in the art.

FIGS. 19-24 illustrate the universal heat engine 60 located in a second position. The engine piston 106 and the output piston 156 are shown moved to the left from the maximum right position. The first fluid flows into the second engine input 82 to move the engine piston 106 to the left in FIG. 19. The first fluid flows from the first engine output 91 as the engine piston 106 moves to the left in FIG. 19.

Concomitantly therewith, the second fluid flows from the first output section output 181 through the reed valve 127 to flow into the output condenser 52. The second fluid flows from the output evaporator 53 into the first output section input 191 through reed valve 161.

FIG. 25-30 illustrate the universal heat engine 60 located in a third position. The engine piston 106 and the output piston 156 are disposed in the maximum left position. Fluid pressure of the first fluid from supply line 221 moves the shuttle valve 114 to the position shown in FIGS. 26 and 27. Fluid pressure of the first fluid from supply line 222 moves the shuttle valve 124 to the position shown in FIGS. 28 and 29. The position of the shuttle valve 114 enables the first fluid to enter the first engine input 81 to urge the engine piston 106 toward the right in FIG. 25. The position of the shuttle valve 124 enables the first fluid to exit from the second engine output 92 as the engine piston 106 moves toward the right in FIG. 25.

FIG. 31-36 illustrate the universal heat engine 60 located in a fourth position. The engine piston 106 and the output piston 156 are shown moved to the right from the maximum left position. The first fluid flows into the first engine input 81 to move the engine piston 106 to the right in FIG. 31. The first fluid flows from the second engine output 92 as the engine piston 106 moves to the right in FIG. 31.

Concomitantly therewith, the second fluid flows from the second output section output 182 through the reed valve 162 to flow into the output condenser 52. The second fluid flows from the output evaporator 53 into the second output section input 192 through reed valve 128.

FIG. 37-42 illustrate the universal heat engine 60 located in a fifth position. The engine piston 106 and the output piston 156 are disposed in the maximum right position similar to FIGS. 13-18. Fluid pressure of the first fluid from supply line 211 is applied to move the shuttle valve 114 into the position shown in FIGS. 20 and 21.

Fluid pressure of the first fluid from supply line 212 is applied to move the shuttle valve 124 to the position shown in FIGS. 22 and 23. The position of the shuttle valve 114 enables the first fluid to enter the second engine input 82 to urge the engine piston 106 toward the left in FIG. 37. The position of the shuttle valve 124 enables the first fluid to exit from the first engine output 91 as the engine piston 106 moves toward the left in FIG. 37.

In operation, a heated first fluid is provided to the engine section input system 80 including the first engine input 81 and the second engine input 82. The shuttle valves 114 and 124 alternately direct the heated first fluid to opposite sides of the engine piston 106. The first fluid is discharged by the engine section output system 90 including the first and second engine outputs 91 and 92. The discharged first fluid is cooled by the engine condenser 51 thereby producing a differential in fluid temperature to power the universal heat engine 60.

Reciprocal operations of the engine piston 106 results in reciprocal movement of the output piston 156. The second fluid is alternately discharged by the output section output system 180 including first and second output section outputs 81 and 82. The compressed second fluid is directed to the output condenser 52 for cooling the compressed second fluid. The compressed second fluid is passed to the metering device 185 to cool the evaporator 53.

Figure 43:
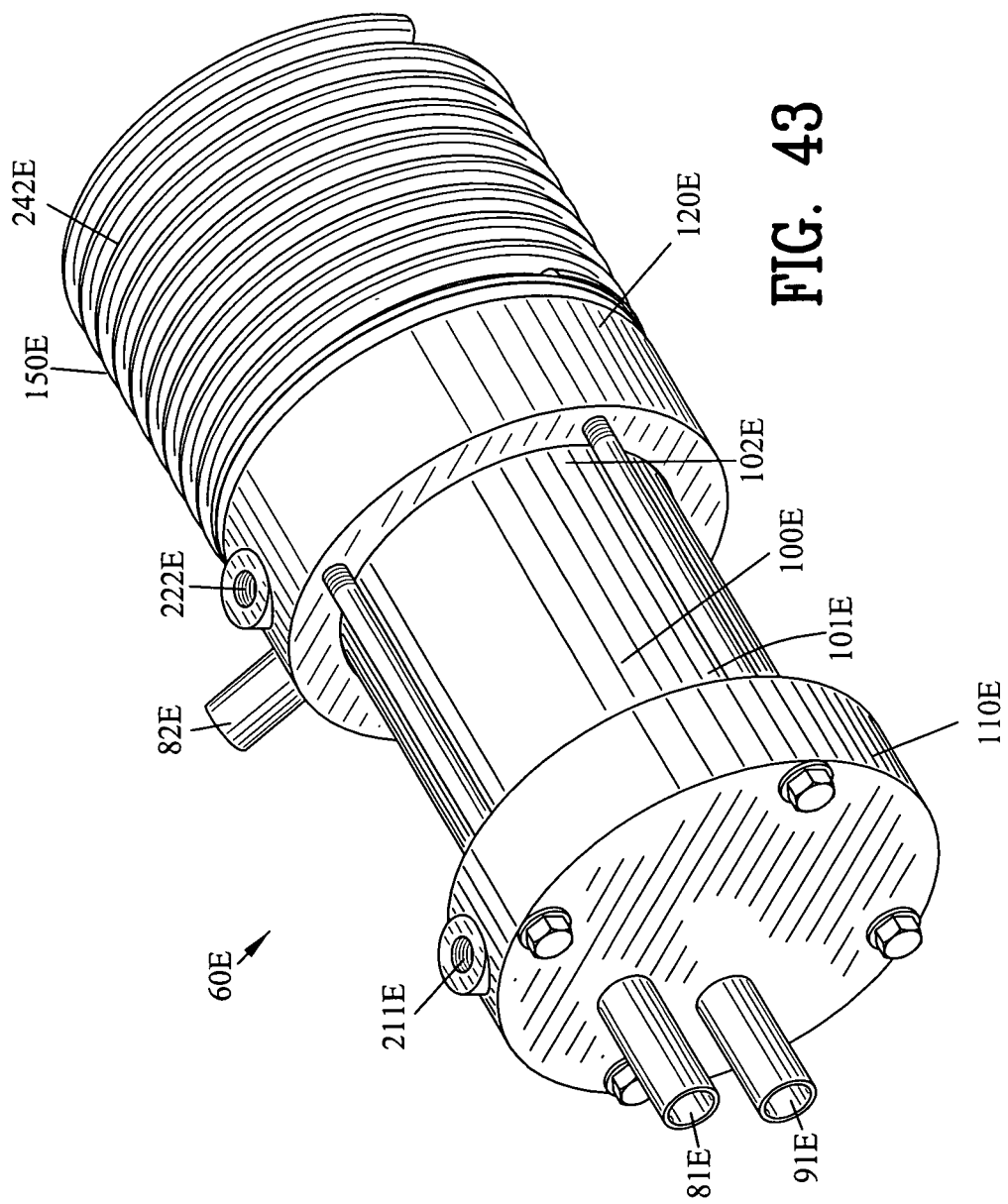
FIG. 43 is an isometric view of the universal heat engine of the present invention configured for generating electric power.
Figure 44:
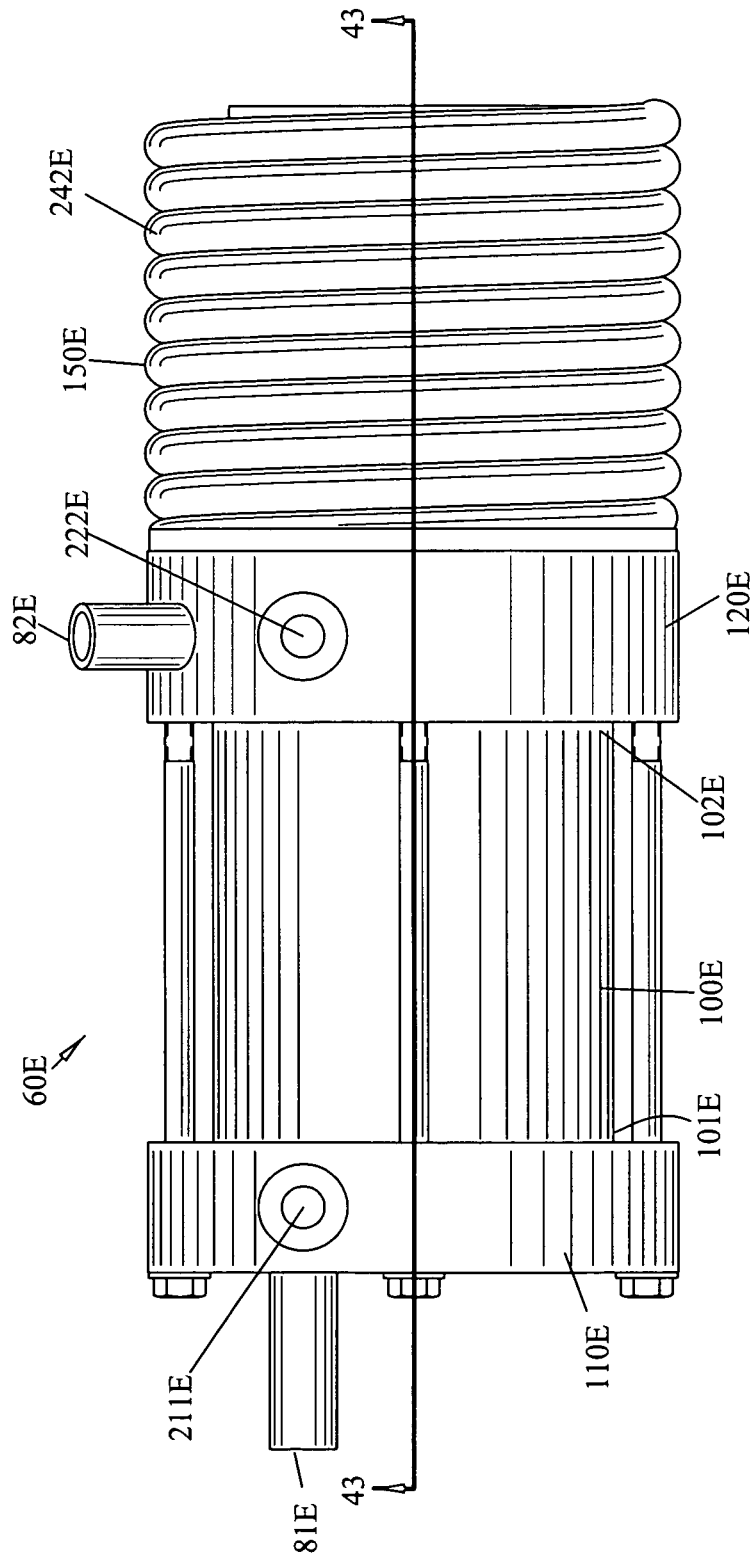
FIG. 44 is a side view of the universal heat engine of FIG. 42.
Figures 45, 45A:
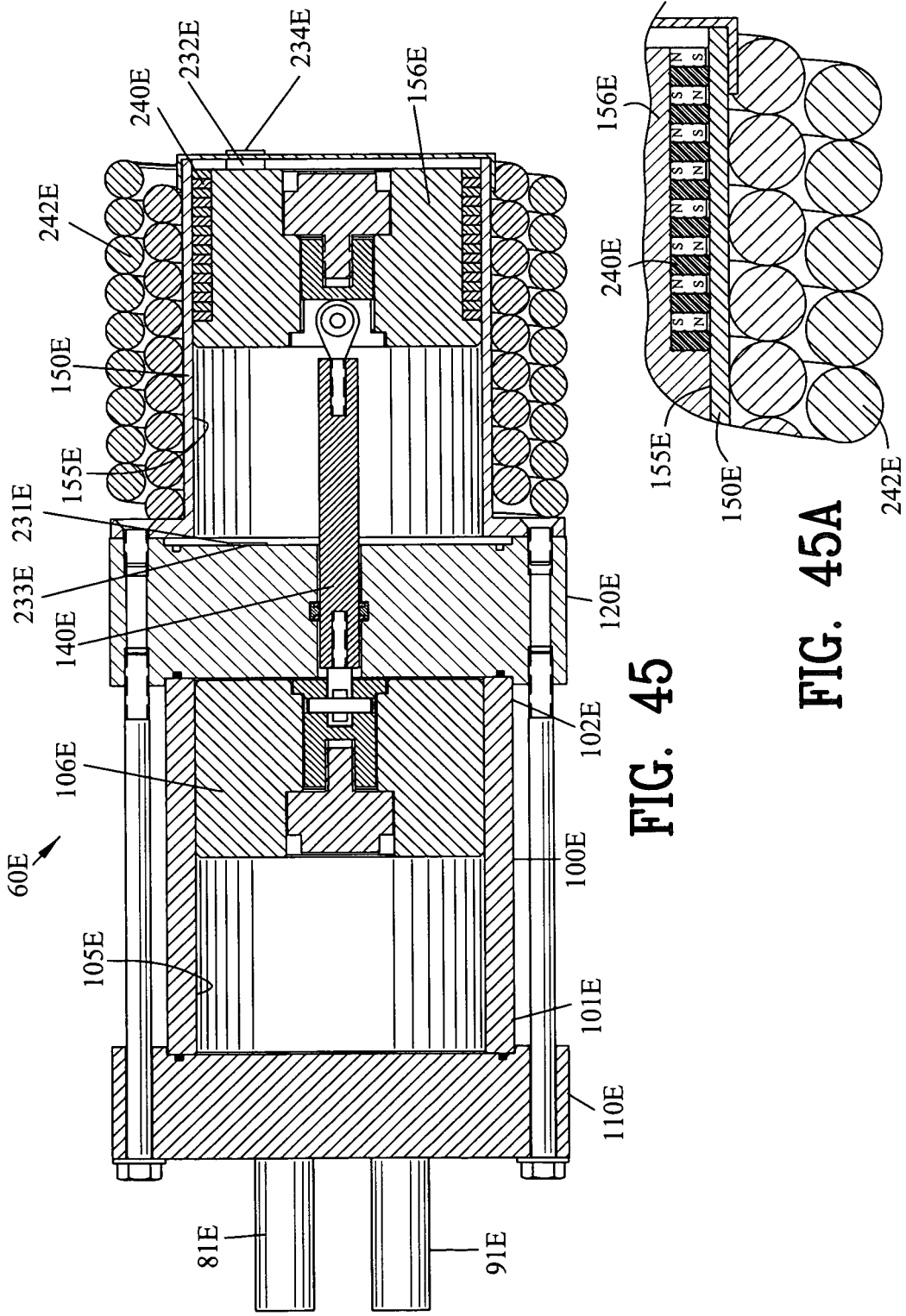
FIG. 45 is a sectional view along line 44-44 in FIG. 43.
FIG. 45A is a magnified view of a portion of FIG. 45.

FIGS. 43-45 are various views of the universal heat engine 60E of the present invention configured for generating electric power. The universal heat engine 60E includes an engine section 100E and an output section 150E. The engine section 100E includes a bore 105E with an engine piston 106E slidably disposed within the bore 105E. The engine section 100E is identical to the engine section 100 shown in FIGS. 8-42.

The output section 150E includes a bore 155E with an output piston 156E slidably disposed within the bore 155E. The output piston 156E is connected to the engine piston 106E by connecting rod 140E in a manner similar to FIGS. 8-42.

The output piston 156E includes a permanent magnet 240E for cooperating with an electrical coil 242E wound about the output section 150E. Reciprocal movement of the engine piston 106E results in reciprocal movement of the permanent magnet 240E within the electrical coil 242E for generating electrical current.

Figure 46:
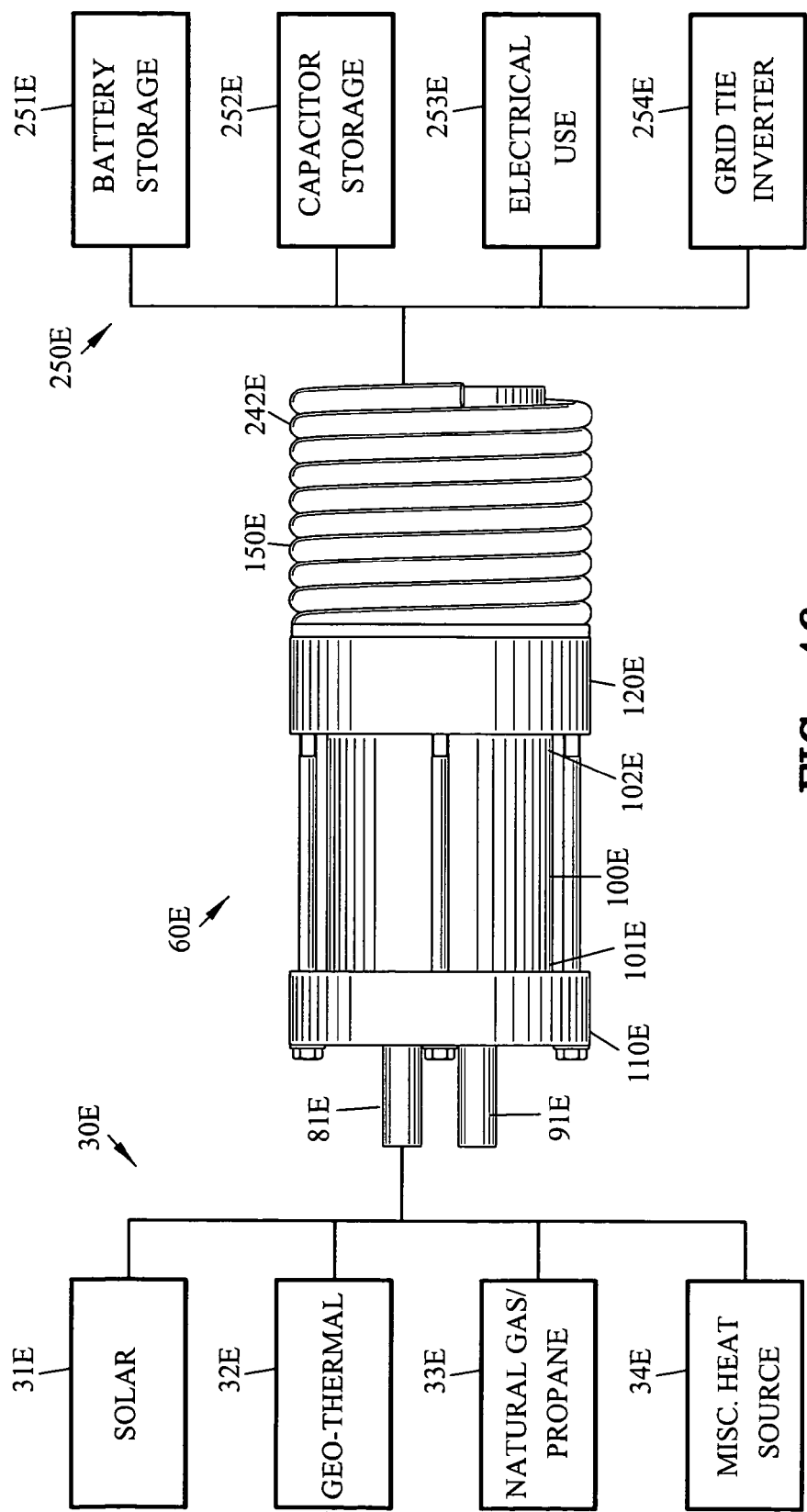
FIG. 46 is a diagram of the universal heat engine of FIGS. 42-44 with alternate heat sources and alternate electrical loads.

FIG. 46 is a diagram of the universal heat engine 60E of FIGS. 43-45 with alternate heat sources 30E and alternate electrical loads 250E. In this example, the alternate heat sources 30E include a solar heat source 31E, a geothermal heat source 32E, a natural gas or propane heat source 33E or any other miscellaneous heat source 34E.

Electrical energy produced by the universal heat engine 60E may be used or stored in various ways. Several examples of alternate electrical loads 250E include battery storage 251E, capacitor storage 252E, direct electrical use 253E and a grid tie inverter 254 to transfer electrical power to the electrical grid.

Figure 47:
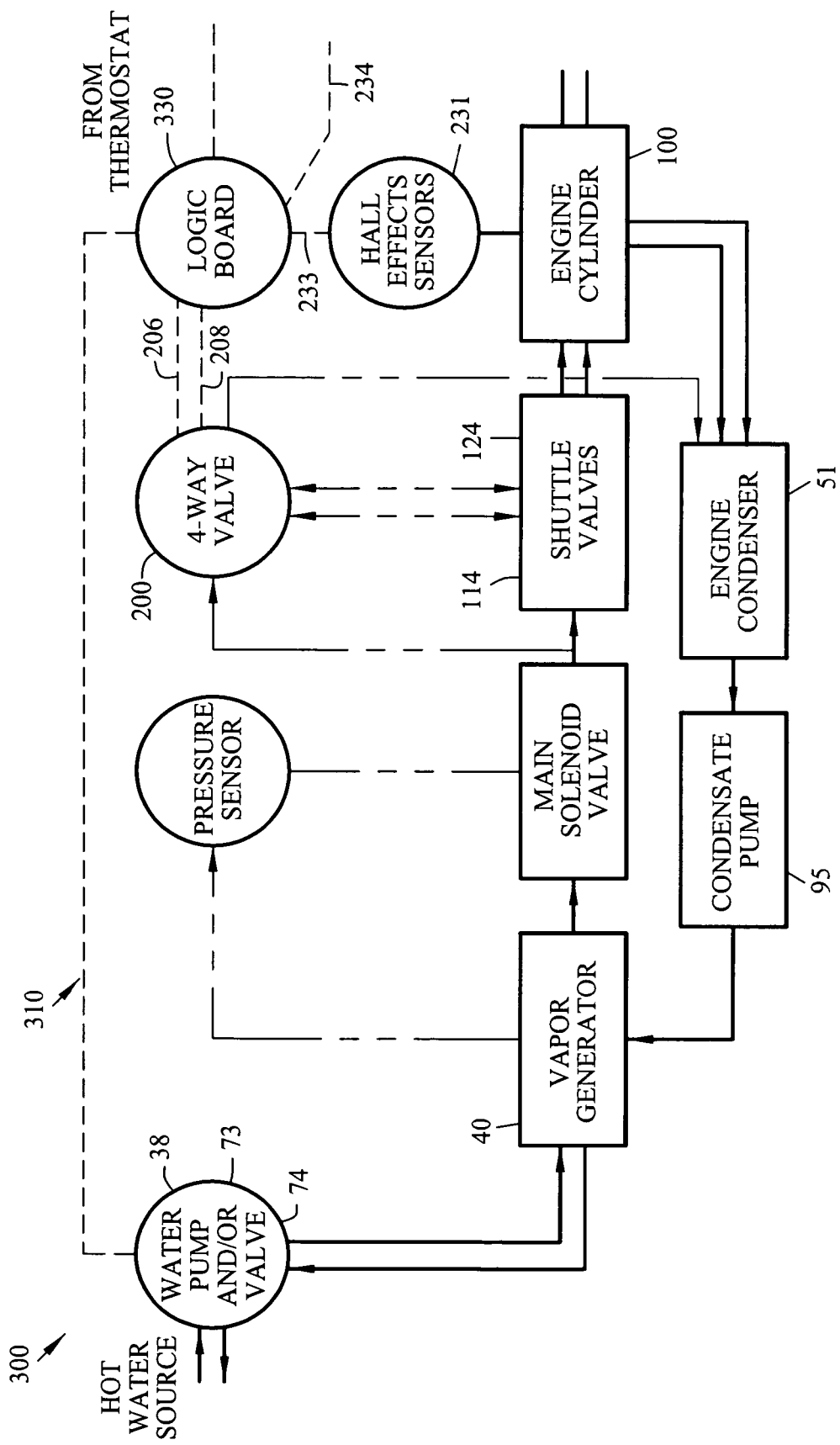
FIG. 47 is a block diagram of a portion of a control system related to the heat engine section of the universal heat engine of the present invention.
Figure 48:
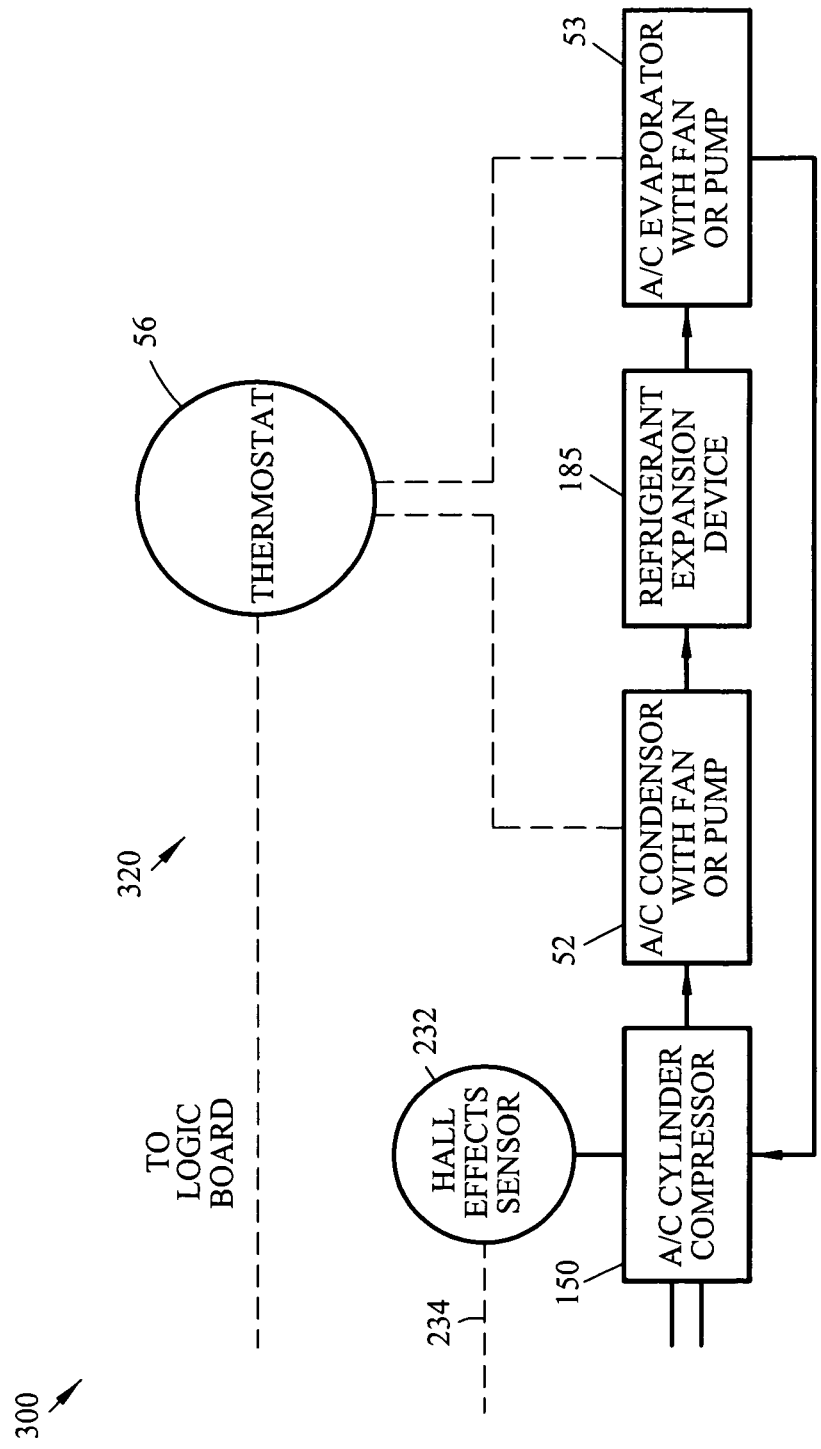
FIG. 48 is a block diagram of a portion of a control system controlling related to the output section of the universal heat engine of the present invention.

FIGS. 47 and 48 are block diagrams of a portion 310 of a control system 300 related to the heat engine section 100 and a portion 320 of a control system 300 related to the output section of the universal heat engine 60 of the present invention.

Figure 49:
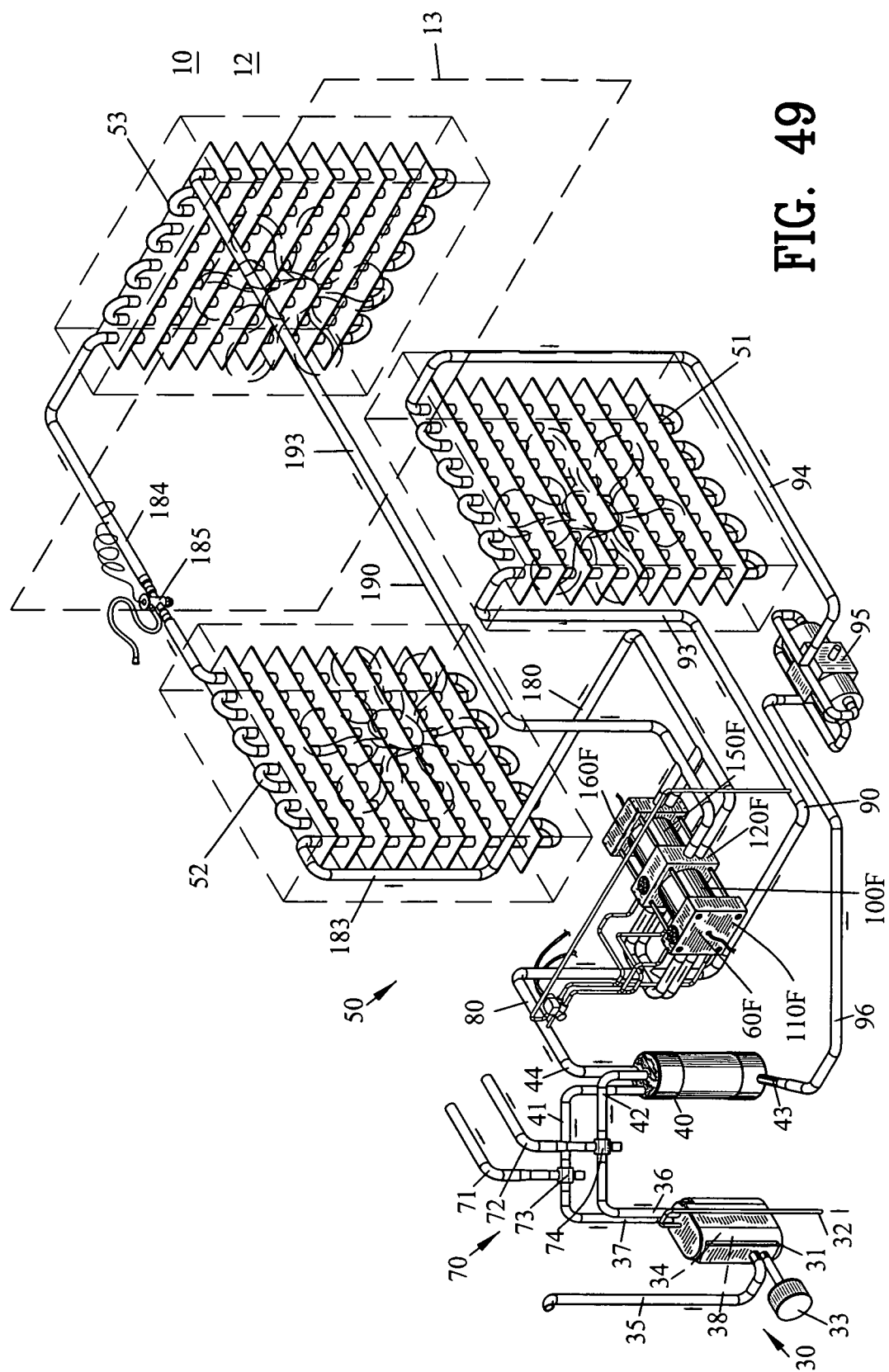
FIG. 49 is an isometric view of a second embodiment of the universal heat engine of the present invention connected in the mobile air conditioning system of FIG. 2.

FIG. 49 is an isometric view of a second embodiment of the universal heat engine 60F of the present invention connected in the mobile air conditioning system 50 of FIG. 2. The mobile air conditioning system 50 is fully explained with reference to FIG. 2. The second embodiment of the universal heat engine 60F replaces the universal heat engine 60 shown in FIGS. 2-42.

Figure 50:
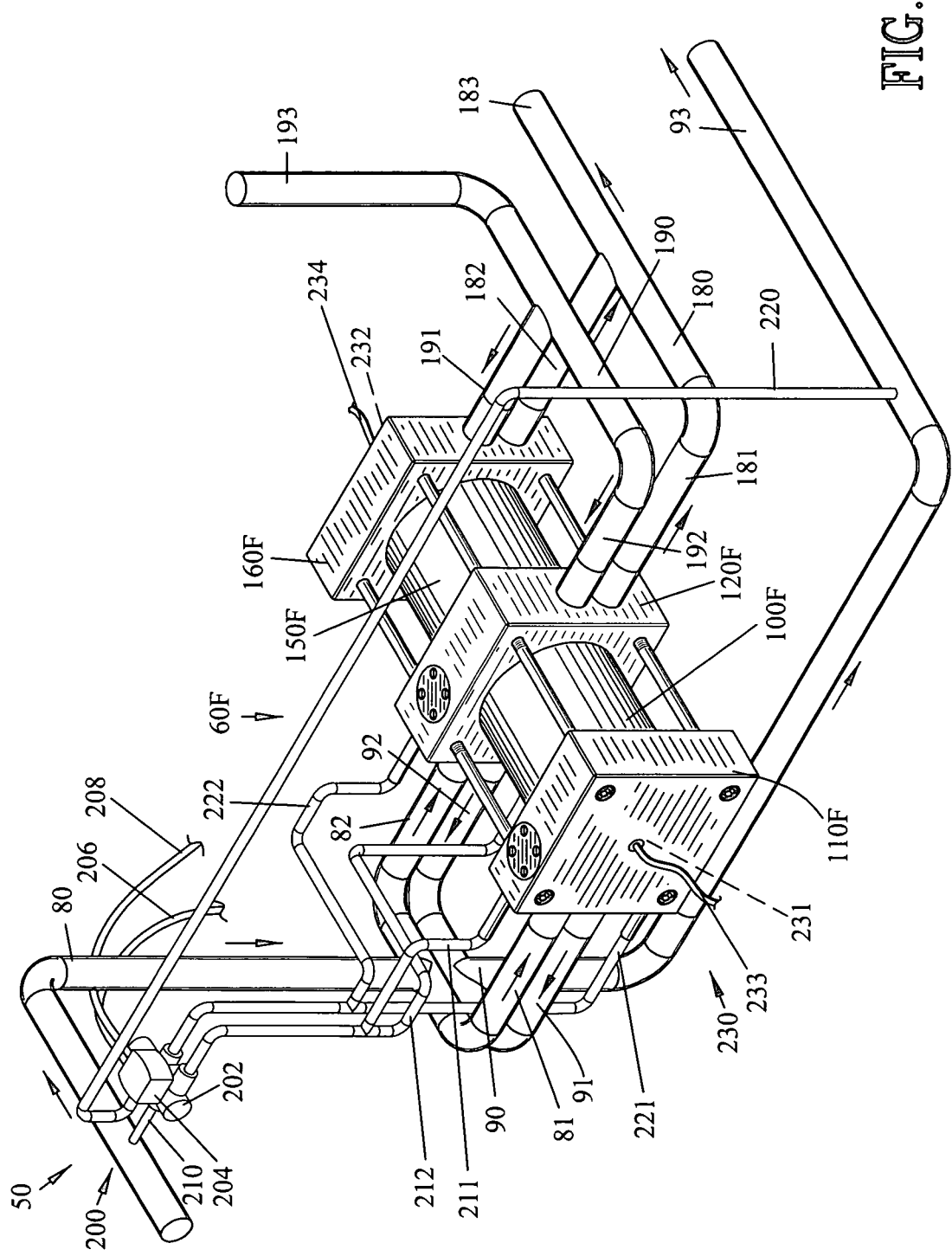
FIG. 50 is a magnified view of a portion of FIG. 49.
Figure 51:
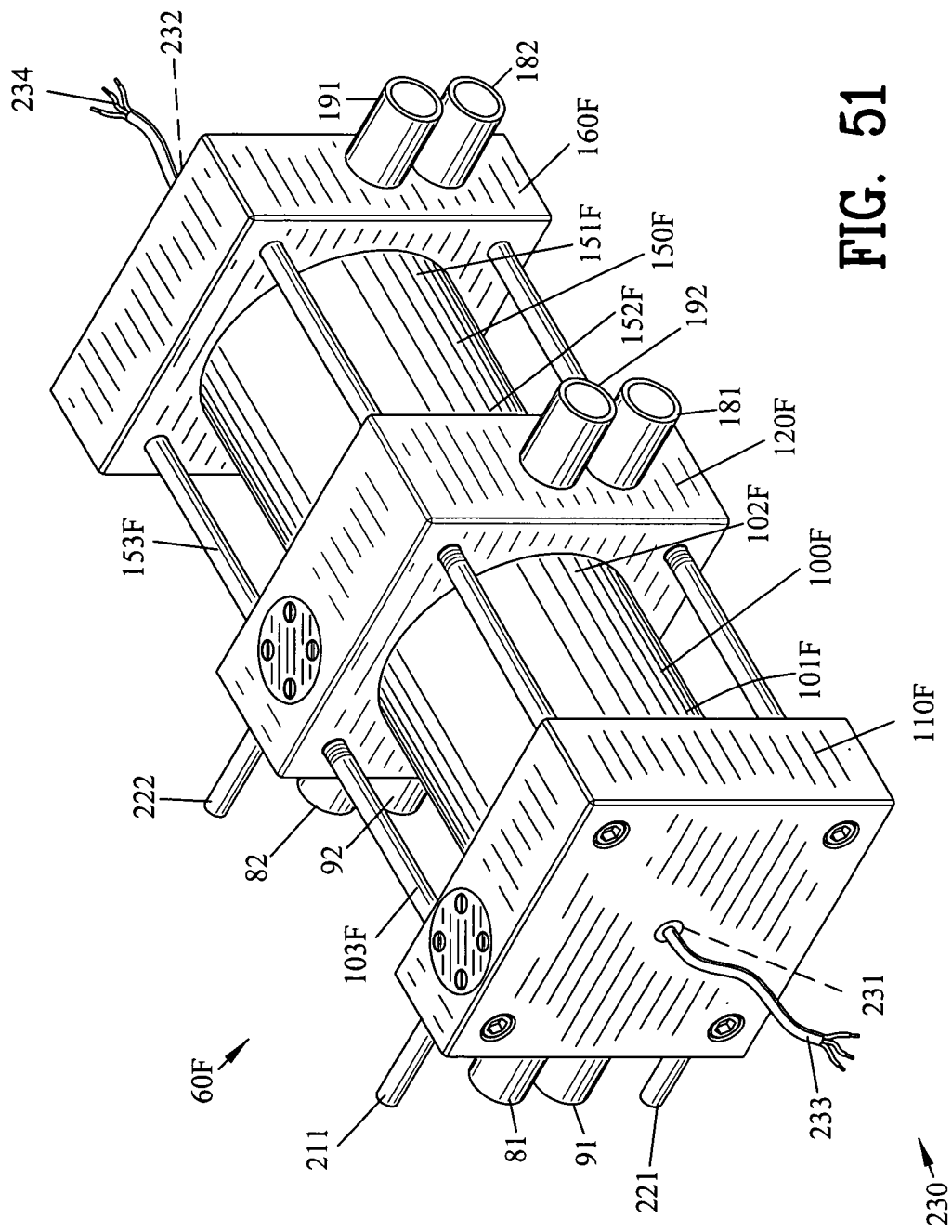
FIG. 51 is an isometric view of the second embodiment of the universal heat engine of the present invention.
Figure 52:
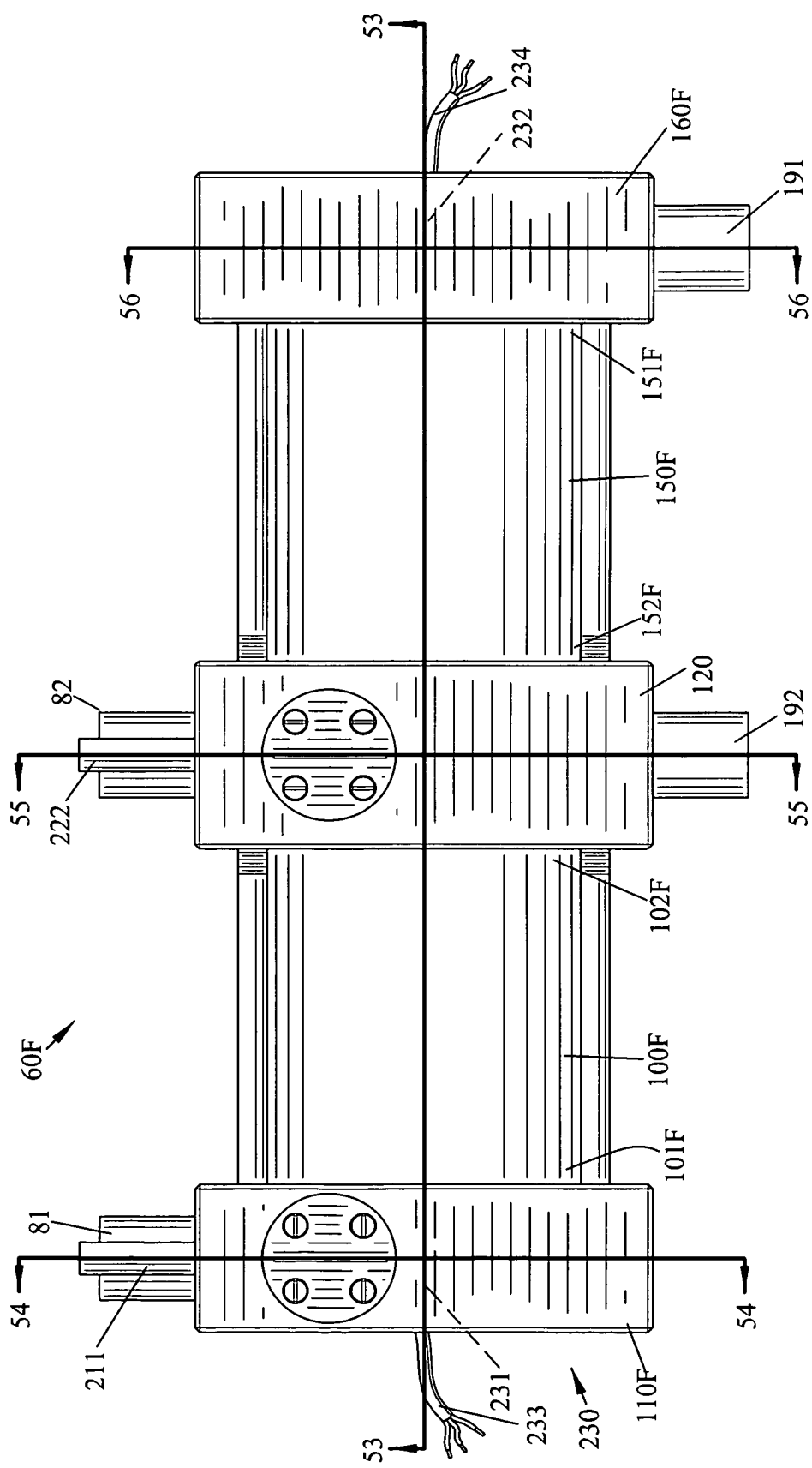
FIG. 52 is a side view of the second embodiment of the universal heat engine of FIG. 51.
Figure 53:
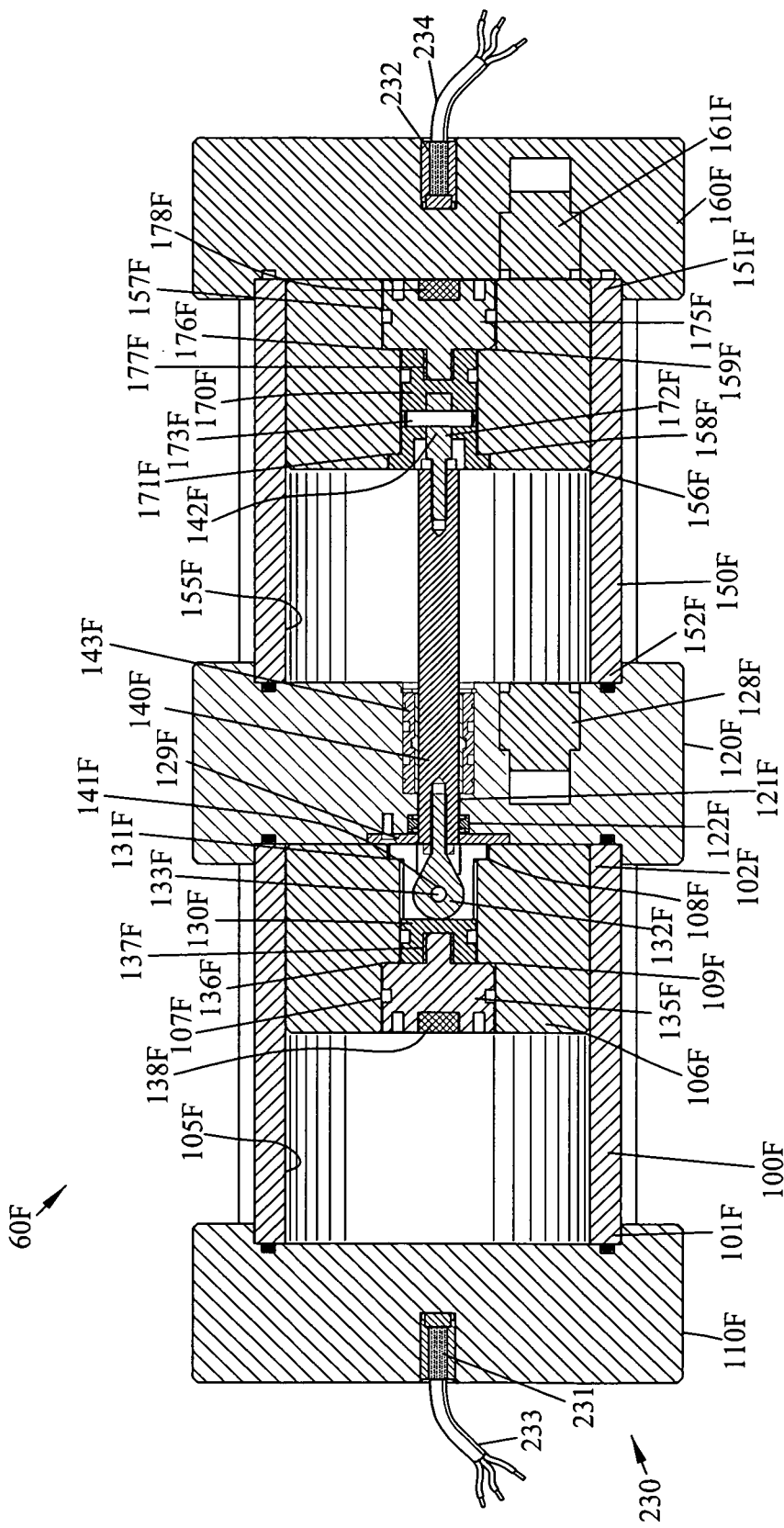
FIG. 53 is a sectional view along line 53-53 in FIG. 52.

FIG. 50 is an enlarged view of a portion of FIG. 49 illustrating the universal heat engine 60F in greater detail. An engine section input system 80 interconnects the vapor generator 40 with the universal heat engine 60F. The engine section output system 90 interconnects the universal heat engine 60F the engine condenser 51.

The universal heat engine 60F comprises an engine section 100F and an output section 150F. The universal heat engine 60F further comprises valve assemblies including an engine section valve assembly 110F, a central valve assembly 120F and an output section valve assembly 160F.

The engine section input system 80 comprises the first and second engine section inputs 81 and 82 connected to the engine section 100F of the universal heat engine 60F. The first and second engine section inputs 81 and 82 are connected to the engine valve assembly 110F and the central valve assembly 120F, respectively. The engine section output system 90 comprises the first and second engine section outputs 91 and 92 connected to the engine condenser 51 by conduit 93. The first and second engine section outputs 91 and 92 are connected to the engine valve assembly 110F and the central valve assembly 120F, respectively. Fluid is returned from the engine condenser 51 through conduit 94, condensate pump 95 and conduit 96 to the fluid input 43 of the vapor generator 40.

The output section output system 180 comprises the first and second output section outputs 181 and 182 connected to the output section 150F of the universal heat engine 60F. The first and second output section outputs 181 and 182 are connected to the central valve assembly 120F and the output valve assembly 160F, respectively. The first and second output section outputs 181 and 182 are connected through conduit 183 to the output condenser 52. The output condenser 52 is connected through conduit 184 to the output evaporator 53.

The output section input system 190 comprises the first and second output section inputs 191 and 192 connected to the output section 150F of the universal heat engine 60F. The first and second output section inputs 191 and 192 are connected to the central valve assembly 120F and the output valve assembly 160F, respectively. The first and second output section inputs 191 and 192 are connected through conduit 193 to the output evaporator 53

The valve actuator system 200 comprises the shuttle valve 202 operated by the valve actuator 204. The valve actuator 204 is connected by connectors 206 and 208 to a second embodiment of a logic board shown in FIG. 57. The valve actuator 204 move the shuttle valve 202 between the first position and the second position as previously described.

The high pressure supply line 210 is connected to the engine section input system 80 whereas the low pressure supply line 220 is connected to the engine section output system 90. Supply lines 211 and 212 connect the shuttle valve 202 to the engine valve assembly 110F and the central valve assembly 120F, respectively. Similarly, supply lines 221 and 222 connect the shuttle valve 202 to the engine valve assembly 110F and the central valve assembly 120F, respectively. The shuttle valve provides high and low fluid pressure to supply lines 211 and 221 when the shuttle valve 202 in the first position and provide low and high fluid pressure to supply lines 211 and 221 when the shuttle valve 202 in the second position as previously described.

The engine section sensor 231 and the output section sensor 232 are located in the engine valve assembly 110F and the output valve assembly 160F, respectively. The engine section sensor 231 and the output section sensor 232 sense the position of the engine piston 106F and the output piston 156F. Connectors 233 and 234 connect the engine section sensor 231 and the output section sensor 232 to the second embodiment of the logic board shown in FIG. 58.

FIGS. 51-56 illustrate various views of the second embodiment of the universal heat engine 60F of the present invention. Similar parts with the universal heat engine 60 shown in FIGS. 2-42 are labeled with similar reference numeral followed by an F.

The engine section 100F of the universal heat engine 60F extends between a distal end 101F and a proximal end 102F. The distal end 101F is sealed to the engine valve assembly 110F. The proximal end 102F is sealed to the central valve assembly 120F. The engine section 100F is secured to the engine valve assembly 110F and the central valve assembly 120F by fasteners 103F threaded into the central valve assembly 120F. The engine section 100F defines a bore 105F. An engine piston 106F is located within the bore 105F for reciprocal movement therein. The engine piston 106F includes a through aperture 107F defining shoulders 108F and 109F.

The output section 150F of the universal heat engine 60F extends between a distal end 151F and a proximal end 152F. The distal end 151F is sealed to the output section about assembly 160F whereas the proximal end 152F is sealed to the central valve assembly 120F. The output section 150F is secured to the output section valve assembly 160F and the central valve assembly 120F by fasteners 153F threaded into the central valve assembly 120F. The output section 151F defines a bore 155F. An output piston 156F is located within the bore 155F for reciprocal movement therein. The output piston 156F includes a through aperture 157F defining shoulders 158F and 159F.

A connecting rod 140F interconnects the engine piston 106F to the output piston 156F through an engine coupling 130F and an output coupling 170F. The connecting rod 140F includes an engine spherical bearing 141F and an output spherical bearing 142F. The connecting rod 140F extends through a central aperture 121F in the central valve assembly 120F. A seal 122F is provided for sealing the engine bore 105F from the output bore 155F. The connecting rod 140F extends through a linear bearing 140F.

The engine coupling 130F including a coupling shoulder 131F is received within the aperture 107F of the piston 106F with a coupling shoulder 131F engaging with the shoulder 108F of the piston 106F. The engine coupling 130F defines a bearing receiver 132F for receiving the spherical bearing 141F of the connecting rod 140F. A bearing pin 133F secures the spherical bearing 141F to the engine coupling 130F.

An engine retainer 135F is inserted from the opposite side of the engine piston 106F with an engine retainer shoulder 136F engaging with the shoulder 109F of the engine piston 106F. The engine retainer 135F is secured to the engine coupling 130F through a threaded engagement 137F. The engine retainer 135F supports a magnet 138F for cooperating with the sensor 231 for sensing the position of the engine piston 106F within the engine bore 105F.

The output coupling 170F including a coupling shoulder 171F is received within the aperture 157F of the piston 156F with a coupling shoulder 171F engaging with the shoulder 158F of the piston 156F. The output coupling 170F defines a bearing receiver 172F for receiving the spherical bearing 142F of the connecting rod 140F. A bearing pin 173F secures the spherical bearing 142F to the output coupling 170F.

An output retainer 175F is inserted from the opposite side of the output piston 156F with an output retainer shoulder 176F engaging with the shoulder 159F of the output piston 156F. The output retainer 175F is secured to the output coupling 170F through a threaded engagement 177F. The output retainer 175F supports a magnet 178F for cooperating with the sensor 232F for sensing the position of the output piston 156F within the output bore 155F.

FIG. 54 is a sectional view illustrating the engine valve assembly 110F. The engine valve assembly 110F includes a valve bore 113F slidably receiving a shuttle valve 114F. The shuttle valve 114F is substantially cylindrical having a region of reduced area defining a shuttle valve flow region 115F. Threaded caps 116F retain the shuttle valve 114F within the valve bore 113F. The supply lines 211 and 221 communicate with opposite ends of the valve bore 113F. A differential in fluid pressure between the supply lines 211 and 221 will move the shuttle valve 114F within the valve bore 113F.

FIG. 55 is a sectional view illustrating the central valve assembly 120F. The central valve assembly 120F includes a valve bore 123F slidably receiving a shuttle valve 124F. The shuttle valve 124F is substantially cylindrical having a region of reduced area defining a shuttle valve flow region 125F. Threaded caps 126F retain the shuttle valve 124F within the valve bore 123F. The supply lines 212 and 222 communicate with opposite ends of the valve bore 123F. A differential in fluid pressure between the supply lines 212 and 222 will move the shuttle valve 124F within the valve bore 123F.

The shuttle valves 114F and 124F control fluid pressure of a first fluid directed to the engine section 100F of the universal heat engine 60F. The first fluid flows in the closed path between the engine section 100F, the engine condenser 51 and the vapor generator 40. Control of the fluid pressure of the first fluid to the engine section 100F results in reciprocation of the engine piston 106F and the output piston 156F within the bores 105F and 155F respectively.

The second embodiment of the universal heat engine 60F utilizes check valves 127D and 128D and check valves 161F and 162F instead of the reed valves 127 and 128 and the reed valves 161 and 162 of the universal heat engine 60 of FIGS. 2-42. The check valves 127D and 128D and check valves 161F and 162F are spring loaded check valves.

The check valve 127D is located in proximity to the first output section output 181 whereas the check valve 128D is located in proximity to the second output section input 192. The check valve 161F is located in proximity to the first output section input 191 whereas the check valve 162F is located in proximity to the second output section output 182.

The second embodiment of the universal heat engine 60F of the present invention shown in FIGS. 49-56 operates in a manner similar to the operation of the universal heat engine 60 of FIGS. 2-42

Figure 57:
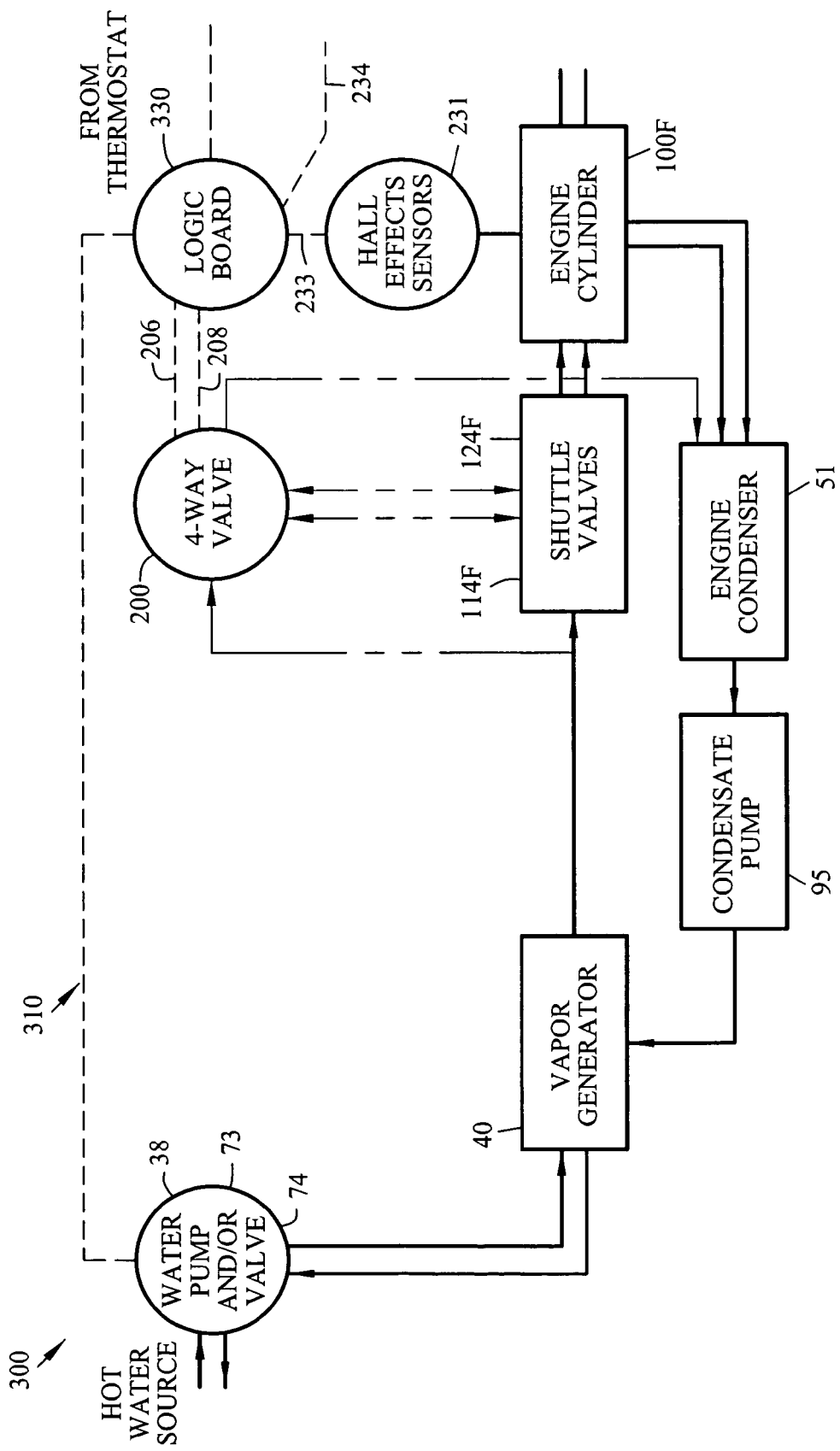
FIG. 57 is a block diagram of a portion of a second embodiment of a control system related to the heat engine section of the second embodiment of the universal heat engine of the present invention.
Figure 58:
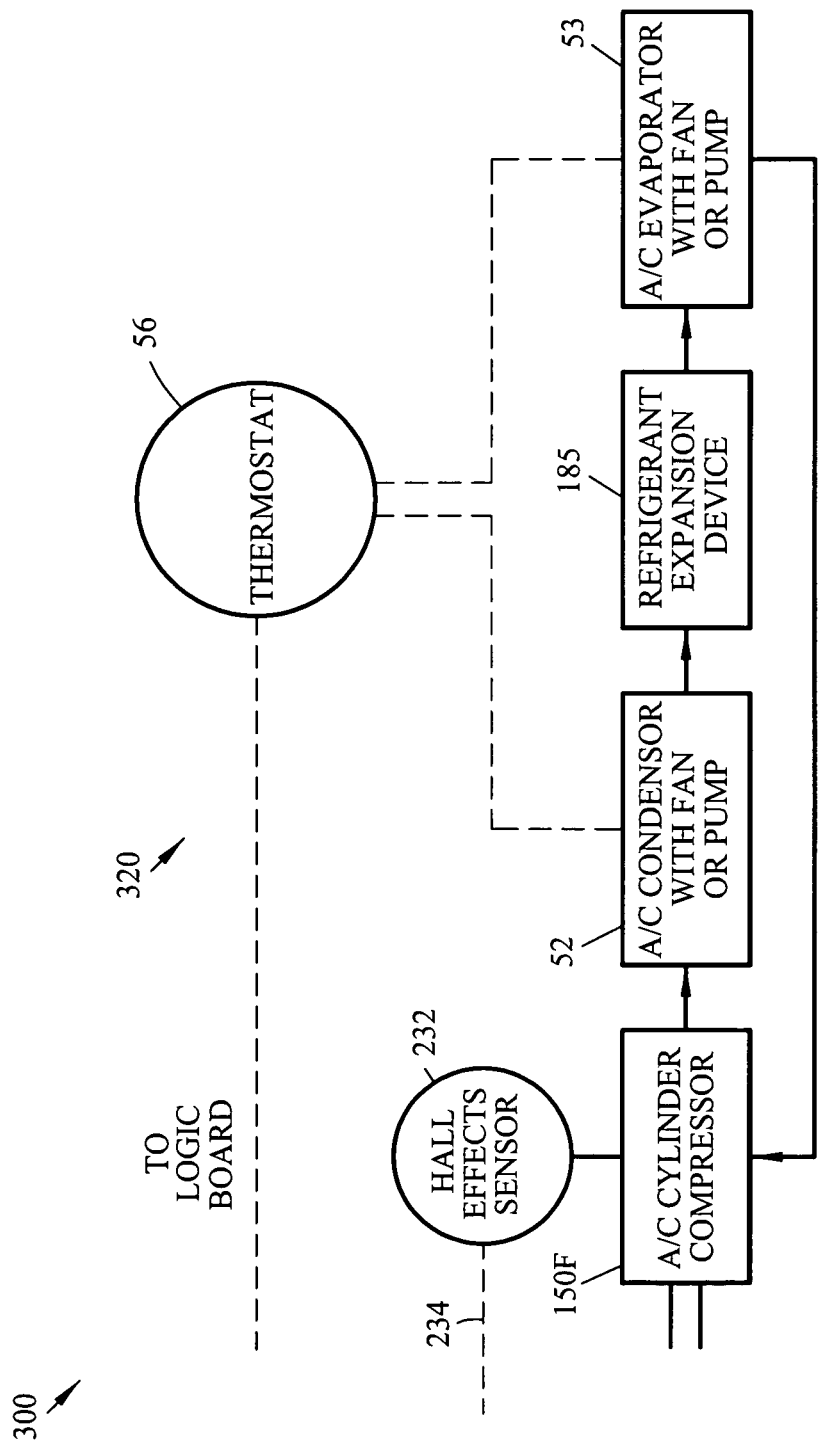
FIG. 58 is a block diagram of a portion of a second embodiment of a control system controlling related to the output section of the second embodiment of the universal heat engine of the present invention.

FIGS. 57 and 58 are block diagrams of a portion 310F of a control system 300F related to the heat engine section 100F and a portion 320F of a control system 300F related to the output section of the second embodiment of the universal heat engine 60F of the present invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A universal heat engine for converting energy from a vapor source to an output device, the vapor source having a high pressure vapor supply and a low pressure vapor return, comprising:
    a heat engine section including,
        a heat engine body extending between a first and a second end and defining a heat engine bore therebetween;
        a first and a second heat engine body end secured to said first and a second end of said heat engine body for sealing opposed ends of said heat engine bore;
        a heat engine piston located in said heat engine bore for reciprocal movement therein;
        a first valve assembly disposed within said first heat engine body end for sequentially communicating the high pressure vapor supply and the low pressure vapor return to said heat engine bore at said first end of said heat engine body,
        a second valve assembly disposed within said second heat engine body end for sequentially communicating the high pressure vapor supply and the low pressure vapor return to said heat engine bore at said second end of said heat engine body,
    an output section including,
        a piston rod connected to said heat engine piston and extending through said second heat engine body end for connection to an output device; and
        a control for sequentially applying the high pressure vapor supply and the low pressure vapor return from the vapor source to said first and second valves for controlling said first and second valves for reciprocating said heat engine piston within said heat engine bore.

2. A universal heat engine as set forth in claim 1, wherein each of said first and second valve assemblies comprises a vapor operated shuttle valve.

3. A universal heat engine as set forth in claim 1, wherein each of said first and second valve assemblies comprises a vapor operated shuttle valve, and
    said control including a solenoid operated valve for directing vapor to said vapor operated shuttle valves.

4. A universal heat engine as set forth in claim 1, including a first spherical bearing disposed on said piston rod for interconnecting to said heat engine piston.

5. A universal heat engine as set forth in claim 1, including a polymeric seal disposed within said second heat engine body end for providing a seal for said reciprocating piston rod.

6. A universal heat engine as set forth in claim 1, including a sensor for sensing the position of said heat engine piston within said heat engine bore; and
    said sensor being connected to said control for controlling said first and second valves for reciprocating said heat engine piston within said heat engine bore.

7. A universal heat engine as set forth in claim 1, including a hall effect sensor for sensing the position of said heat engine piston within said heat engine bore; and
    said hall effect sensor being connected to said control for controlling said first and second valves for reciprocating said heat engine piston within said heat engine bore.

8. A universal heat engine as set forth in claim 1, wherein said output section comprises an air conditioning system.

9. A universal heat engine as set forth in claim 1, wherein said output section comprises an electrical generator.

10. A universal heat engine as set forth in claim 1, wherein the vapor source includes a vapor generator.

11. A universal heat engine for converting energy from a vapor source to an output device, the vapor source having a high pressure vapor supply and a low pressure vapor return, comprising:
    a heat engine section including,
        a heat engine body extending between a first and a second end and defining a heat engine bore therebetween;
        a first and a second heat engine body end secured to said first and a second end of said heat engine body for sealing opposed ends of said heat engine bore;
        a heat engine piston located in said heat engine bore for reciprocal movement therein;
        a first valve assembly disposed within said first heat engine body end comprising a first valve bore and a first shuttle valve,
        said first valve bore defined in said first valve assembly for connecting the high pressure vapor supply and the low pressure vapor return to said first valve bore;
        said first shuttle valve slidably received in said first valve assembly valve bore for sequentially communicating the high pressure vapor supply and the low pressure vapor return to said heat engine bore at said first end of said heat engine body,
        a second valve assembly disposed within said second heat engine body end comprising a second valve bore and a second shuttle valve,
        said second valve bore defined in said second valve assembly for connecting the high pressure vapor supply and the low pressure vapor return to said second valve bore;

said second shuttle valve slidably received in said second valve bore for sequentially communicating the high pressure vapor supply and the low pressure vapor return to said heat engine bore at said second end of said heat engine body, an output section including, a piston rod connected to said heat engine piston and extending through said second heat engine body end for connection to an output device; and a control for controlling said first and second shuttle valves for reciprocating said heat engine piston within said heat engine bore.

12. A universal heat engine as set forth in claim 11, wherein said control includes a solenoid operated valve for directing vapor to operate said first and second shuttle valves.

13. A universal heat engine as set forth in claim 11, including a first spherical bearing disposed on said piston rod for interconnecting to said heat engine piston.

14. A universal heat engine as set forth in claim 11, including a polymeric seal disposed within said second heat engine body end for providing a seal for said reciprocating piston rod.

15. A universal heat engine as set forth in claim 11, including a sensor for sensing the position of said heat engine piston within said heat engine bore; and said sensor being connected to said control for controlling said first and second valves for reciprocating said heat engine piston within said heat engine bore.

16. A universal heat engine as set forth in claim 11, including a hall effect sensor for sensing the position of said heat engine piston within said heat engine bore; and said hail effect sensor being connected to said control for controlling said first and second valves for reciprocating said heat engine piston within said heat engine bore.

17. A universal heat engine as set forth in claim 11, wherein said output section comprises an air conditioning system.

18. A universal heat engine as set forth in claim 11, wherein said output section comprises a linear electrical generator.

19. A universal heat engine for converting energy from a vapor source to an output device, the vapor source having a high pressure vapor supply and a low pressure vapor return, comprising:

a heat engine section including, a heat engine body extending between a first and a second end and defining a heat engine bore therebetween;

a first and a second heat engine body end secured to said first and a second end of said heat engine body for sealing opposed ends of said heat engine bore;

a heat engine piston located in said heat engine bore for reciprocal movement therein;

a first valve assembly secured to said first heat engine body end comprising a first valve bore and a first shuttle valve, said first valve bore defined in said first valve assembly for connecting the high pressure vapor supply and the low pressure vapor return to said first valve bore;

said first shuttle valve slidably received in said first valve assembly valve bore for sequentially communicating the high pressure vapor supply and the low pressure vapor return to said heat engine bore at said first end of said heat engine body, a second valve assembly secured to said second end of said heat engine body comprising a second valve bore and a second shuttle valve, said second valve bore defined in said second valve assembly for connecting the high pressure vapor supply and the low pressure vapor return to said second valve bore;

said second shuttle valve slidably received in said second valve bore for sequentially communicating the high pressure vapor supply and the low pressure vapor return to said heat engine bore at said second end of said heat engine body, an output section including, an output body defining an output bore extending between a first and a second output body end;

an output piston located in said output bore;

a piston rod interconnecting said heat engine piston to said output piston;

and a control including a solenoid operated valve for directing vapor to control said first and second shuttle valves for reciprocating said heat engine piston within said heat engine bore.

20. A universal heat engine as set forth in claim 19, including a first and a second spherical bearing disposed on opposed ends of said piston rod for interconnecting said heat engine piston to said output piston.

21. A universal heat engine as set forth in claim 19, including polymeric seal disposed within said second heat engine body end for providing a seal between opposed ends of said reciprocating piston rod.

22. A universal heat engine as set forth in claim 19, including a hall effect sensor for sensing the position of said heat engine piston within said heat engine bore; and said hall effect sensor being connected to said control for controlling said first and second shuttle valves for reciprocating said heat engine piston within said heat engine bore.

23. A universal heat engine as set forth in claim 19, wherein said output section comprises an air conditioning system.

24. A universal heat engine as set forth in claim 19, wherein said output section comprises an electrical generator.

25. A universal heat engine as set forth in claim 19, including a polymeric seal for providing a seal between opposed ends of said reciprocating piston rod interconnecting said heat engine piston to said output piston.

26. A universal heat engine as set forth in claim 19, including a sensor for sensing the position of said heat engine piston within said heat engine bore.

27. A universal heat engine as set forth in claim 19, including a ball effect sensor for sensing the position of said heat engine piston within said heat engine bore.

28. A universal heat engine as set forth in claim 19, including a solenoid operated control valve for directing vapor into said plural first and second supply lines for sliding said first and second shuttle valves within said first and second valve bores.

* * * * *